United States Patent
Hoennig et al.

(10) Patent No.: US 7,003,773 B2
(45) Date of Patent: Feb. 21, 2006

(54) DYNAMIC INTERFACE AGGREGATION ON DEMAND

(75) Inventors: Michael Hoennig, Hamburg (DE); Markus Meyer, Winsen/Luhe (DE)

(73) Assignee: Sun Microsystems, Inc., Santa Clara, CA (US)

( * ) Notice: Subject to any disclaimer, the term of this patent is extended or adjusted under 35 U.S.C. 154(b) by 639 days.

(21) Appl. No.: 10/107,236

(22) Filed: Mar. 26, 2002

(65) Prior Publication Data

US 2002/0144012 A1 Oct. 3, 2002

(30) Foreign Application Priority Data

Mar. 26, 2001 (EP) .................................. 01106497

(51) Int. Cl.
*G06F 3/00* (2006.01)
*G06F 9/44* (2006.01)

(52) U.S. Cl. ..................... 719/311; 719/312; 719/313; 719/332; 717/108; 717/162; 717/165

(58) Field of Classification Search ........ 719/310–320, 719/332; 709/200–203, 217–219; 717/162–167, 717/108
See application file for complete search history.

(56) References Cited

U.S. PATENT DOCUMENTS

| | | | |
|---|---|---|---|
| 5,794,038 A * | 8/1998 | Stutz et al. .................. 719/315 |
| 5,872,973 A * | 2/1999 | Mitchell et al. ............. 719/332 |
| 6,085,030 A | 7/2000 | Whitehead et al. ..... 395/200.33 |
| 6,256,678 B1 * | 7/2001 | Traughber et al. .......... 719/310 |
| 6,651,248 B1 * | 11/2003 | Alpern ....................... 717/162 |
| 6,694,506 B1 * | 2/2004 | LeBlanc et al. ............ 717/108 |

FOREIGN PATENT DOCUMENTS

| EP | 0 822 490 A2 | 2/1998 |
|---|---|---|
| WO | WO 00 77632 A1 | 12/2000 |

OTHER PUBLICATIONS

Orfali et al., "The Essential Distributed Objects Survival Guide", John Wlley and Sons, Inc., 1996, pp. 78-84.*
Trevor, J. et al., "The Use of Adapters to Support Cooperative Sharing", Transcending Boundaries, CSCW 1994, pp. 219-230, XP002174728.
Konstantas, D., "Object Oriented Interoperability", ECOOP, Jul. 26-29, 1993, Kaiserslautern, Germany, XP002174729.

* cited by examiner

*Primary Examiner*—Majid Banankhah
(74) *Attorney, Agent, or Firm*—Gunnison, McKay & Hodgson, L.L.P.; Forrest Gunnison

(57) ABSTRACT

A system dynamically generates interfaces on demand during runtime execution of an application containing a plurality of objects. A user object generates a request for an interface of a service object. The service object, if the interface is not available, generates an adapter request and transmits same to an adapter manager. The adapter manager selects an interface adapter based on the adapter request from a library of interface adapters or aggregates a composite adapter and transmits the obtained interface adapter to the service object. The service object enables access from the user object based on the received interface adapter.

58 Claims, 11 Drawing Sheets

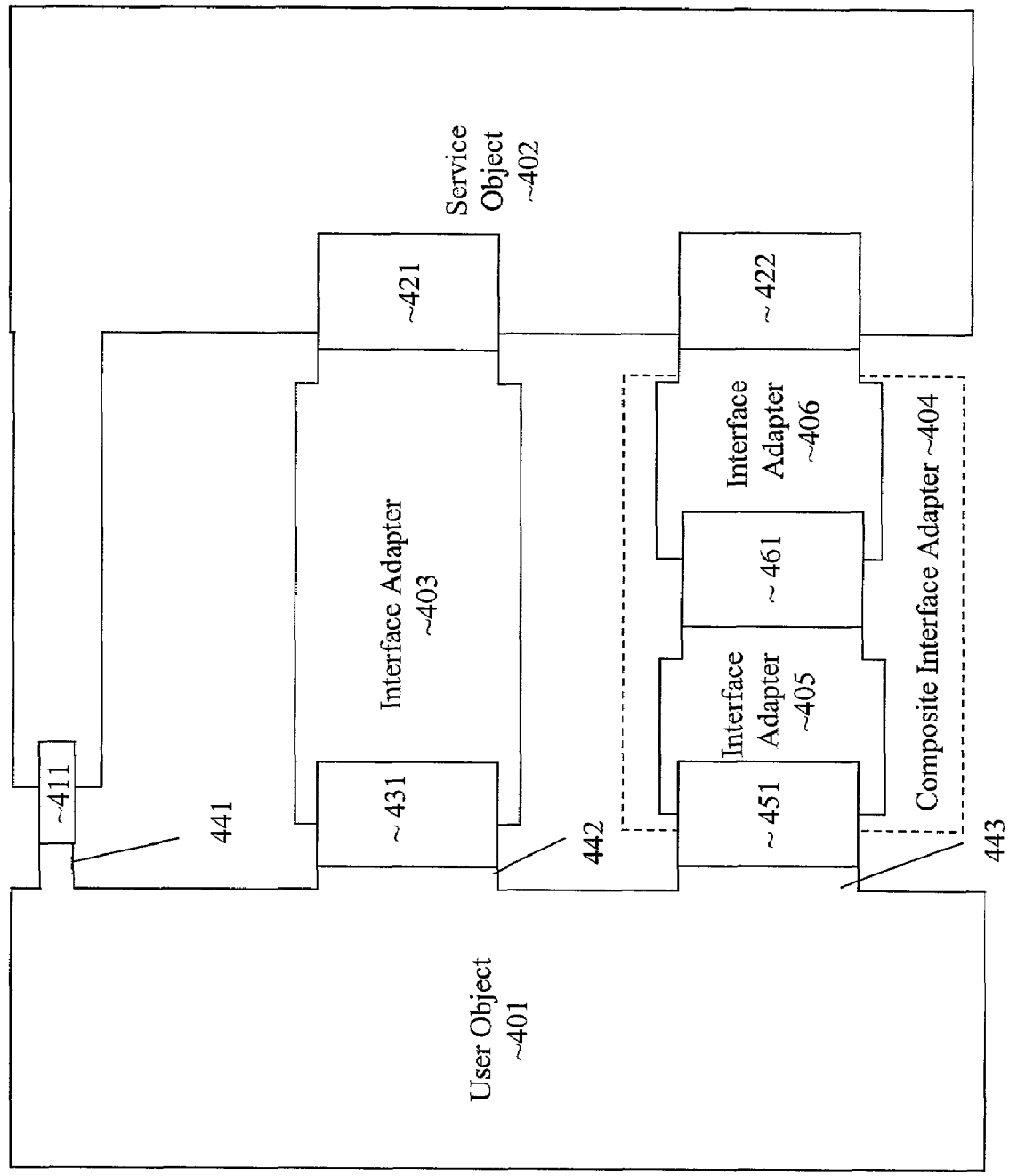

DYNAMIC INTERFACE AGGREGATION ON DEMAND

BACKGROUND OF THE INVENTION

1. Field of the Invention

The invention relates generally to communications between computer program objects and more particularly to a method of dynamic interface generation at an adapter manager and a service object, and further to a corresponding adapter manager and service object.

2. Description of Related Art

Computers are valuable assistants in an ever-growing number of fields. In the past computers were predominantly used for highly specialized applications, such as to support scientific work in research institutions, and thus were not highly proliferated. Today, virtually everyone uses computers for the widest range of applications. Applications include for example personal data services, office applications, e-mail, home banking applications, home shopping applications and similar.

Further, while in the early days application programs were usually executed on a single computer, today large networks of computers are often used for executing distributed applications, for example in client and server scenarios. Such application programs can be written as a single program, i.e., one piece of code. However, with the applications becoming ever more complex, writing a single program becomes very difficult. In many cases, writing a single program is most uneconomical, as often a number of different application programs or parts of application programs use similar functionality. Thus, computer programs are generally written in modules, which communicate with one another and exchange data in providing service to a user.

Structuring application programs into modules is facilitated by modern computer languages such as the C++ programming language, or any other object-oriented programming language, and by interface standards like CORBA or DECOM.

Object-oriented programming supports object technology, i.e., to structure an application program into individual objects. Typically, each object provides a certain functionality of the application program. For example, in a simple application program, an object realizes the functionality of a cursor on a screen, and this object interacts with further objects, for example objects providing functionality for drawing shapes and similar functionality.

To enable the objects, forming part of an application program or a plurality of application programs, to communicate with one another, i.e., to exchange data, interfaces between the individual objects must be available. These interfaces define the nature and format of data to be transmitted from one object to another object.

Generally, an object provides a plurality of such interfaces for communication with other objects. For example, to allow data transfer from one object to another object, the object (the requesting object) wishing to obtain service from the another object (the accessed object) requests a required interface from the another object to be accessed. Upon receiving the request, the accessed object provides the required interface.

In the prior art, the interfaces provided by an object formed an integral part of the object and were generally designed when originally writing the computer program code of the object. Thus, any capability of the object to communicate with the outside world, i.e. with other objects, was defined through the interfaces designed when writing the corresponding object.

Forming interfaces as an integral part of objects, however, means that in complex applications with a potentially very large number of interfaces, a large program overhead is generated, possibly replicating specific interfaces with different objects. Further, even if forming interfaces as an integral part of objects of an application program works well in a static environment, where access schemes between individual objects do not change, this may not work in a dynamic environment.

For example, consider a scenario where a plurality of application programs access a set of common objects. Some of the common objects are updated to a newer version and now require modified interfaces from the accessing applications. Different versions of the commonly accessing applications have to be provided. The different versions provide the required interfaces to the updated common objects and to the other common objects that were not updated.

Likewise, when one of the application programs is updated to a newer version and now requires modified interfaces from the commonly accessed objects, different versions of the commonly accessed objects have to be provided. The different versions of commonly assessed objects provide the required interfaces to the updated application programs and to the other application programs that were not updated.

Similar problems arise, if within a single application program a subgroup of the objects making up the application program are updated, leading to the requirement of different interfaces at accessed objects. This also leads to the requirement to provide different interface versions of objects, leading to high coding expenses and a large program overhead. Moreover, such problems arise when combining APIs (application program interfaces) such as Bonobo and OpenOffice.org, e.g. to access common objects.

Of course, instead of providing different versions of objects, the objects could be rewritten to satisfy all interface needs; however, this leads to the same disadvantages. Thus, all of the above examples share the disadvantage of either creating large numbers of derivations of object implementations or of creating a single or few implementations with a very large number of interfaces for all purposes.

SUMMARY OF THE INVENTION

In one embodiment of this invention, a system provides an environment where interfaces between different objects are provided on demand, e.g. during runtime. According to an embodiment, a method of dynamic interface generation at an adapter manager includes receiving from a service object an adapter request at least including information on at least one offer-interface offered by the service object, and a request-interface demanded by a user object; obtaining an interface adapter from the request-interface to the at least one offer-interface offered by the service object; and transmitting at least information on the interface adapter to the service object, including e.g. the adapter itself, an address or pointer indicating a storage location of the interface adapter, for enabling the user object to access the service object.

Thus, interface adapters, providing the required functionality to allow different objects to access one another, are obtained through the adapter manager on demand, e.g. during runtime. The interface adapter is transmitted to the service object to provide the service object with the required interface functionality to be accessed by the user object.

Since the adapter request includes the necessary information on the request-interface and the interfaces offered by the service object, the adapter manager obtains an appropriate interface adapter, which for example may be previously coded and stored at a location accessible by the adapter manager. The interface adapter may further be selected from a library of interface adapters available to the adapter manager. Thus, the adapter manager is able to access a potentially large number of interface adapters stored in a library, for example in a database.

An interface adapter, in one embodiment, is selected by the adapter manager based on a list of offered interfaces for each interface adapter including at least one offered interface and a list of needed interfaces including at least one needed interface. Thus, since the interface adapters available for selection by the adapter manager are defined by their offered and needed interfaces, the selection operation is easily performed, as the adapter manager knows about the request-interface, requested by the user object, and the at least one offered interface available at the service object. The adapter manager finds an interface adapter with an offered interface matching the request-interface, requested by the user object, and with needed interface(s) matched, e.g. covered by, the offer-interface(s) at the service object.

If more than one suitable interface adapter is available, an interface adapter, in one embodiment, is selected based on a classifier stored in connection with the adapters. The classifier corresponds to a quality of the interface adapter, such as computational requirements and similar, and the optimum interface adapter is selected based on the classifier.

Further, if an interface adapter is not available, the adapter manager, in yet another embodiment, aggregates interface adapters to generate a composite interface adapter based on a plurality of the interface adapters. The adapter manager thus satisfies the need for a request-interface based on offer-interfaces at the service object by combining more than one interface adapter to form a composite interface adapter.

The composite interface adapter includes a first interface adapter connecting the request-interface to at least one intermediate interface and a second interface adapter connecting the at least one intermediate interface to the at least one offer-interface, i.e. the interfaces available at the service object. Accordingly, interface adapters are concatenated, in this example, in a series connection to form a composite interface adapter from the request-interface to the at least one offered interface. Thus, instead of maintaining a large number of full interface adapters, a smaller number of partial interface adapters may be maintained, which then are connected as appropriate to form the interface adapter from the request-interface to the at least one offered interface.

Further, the composite interface adapter may include a third interface adapter connecting a first part of the request-interface to the at least one offer-interface, and a fourth interface adapter connecting a second part of the request-interface to the at least one offer-interface. Accordingly, the interface adapters may also be combined in a parallel connection, and as before, a number of required interface adapters may be reduced, since interface adapters may be generated by parallel connections of interface adapters to form composite interface adapters from the request-interface to the at least one offer-interface.

Any composite interface adapter generated by the adapter manager is included in the library of interface adapters to avoid a repeated aggregation of the composite interface adapter upon further adapter requests from service objects.

A classifier is stored in association with the composite interface adapter in the library. The classifier indicates that the composite interface adapter is a composite interface adapter. The classifier is used for selecting a composite interface adapter from the library of adapters only if a corresponding interface adapter, not being a composite interface adapter, does not exist. As composite interface adapters may be computationally more expensive than regular interface adapters, such a composite interface adapter is only selected if a corresponding generic interface adapter is not available.

The adapter request may further include information on an access interface at the service object, allowing the adapter manager to access the service object to determine offer-interfaces available at the service object. Thus, the adapter request may only include indirect information on the offer-interfaces.

The adapter request from the service object may also include information on data or types of data available at the service object, enabling the adapter manager to select an indirect interface adapter. The indirect interface adapter allows the user object to access the data at the service object through at least one interface available at the service object not initially designed for such access.

During the above operations, in one embodiment, the service object determines whether at least a part of the request-interface can be directly served by at least one interface available at the service object. In this case, the user object can directly access the service object based on the part of the offer-interface. The service object then generates an adapter request based on a remaining part of the request-interface. With this technique the interfaces already existing at the service object may be directly used, thus reducing computational complexity.

The service object may also include a link to a legacy object, the legacy object being an object not arranged to generate an adapter request for an interface adapter, i.e. for an unavailable interface. As the service objects may include links to the legacy objects, when for example updating objects, old objects, i.e. legacy objects, which do not have the functionality to generate adapter requests, may still be supported, reducing the requirement for rewriting code.

The service objects for linking to legacy objects are provided by a wrapper object factory and the legacy objects are provided by a legacy object factory. Thus, the service object with the link to the legacy object is automatically generated by the wrapper object factory and similarly, a required legacy object is provided by the legacy object factory.

According to a further embodiment, a method of dynamic interface generation executed at a service object includes receiving, at the service object from a user object, a user request for a request-interface; generating an adapter request for transmission to an adapter manager, the adapter request at least including information on offer-interfaces, offered by the service object, and the request-interface; transmitting the adapter request to the adapter manager to instruct the adapter manager to obtain an interface adapter from the request-interface to at least one of the offer-interfaces at the service object; and receiving at least information on the interface adapter and enabling an access from the user object based on the interface adapter.

With the above operations, the service object is advantageously provided with an interface adapter, eliminating the need for changing existing code, if changed interface requirements emerge, e.g. due to updating operations of subgroups of objects of an application program or a plurality of application programs.

The service object advantageously transmits an address of the interface adapter to the user object for enabling the user object to access the service object. Thus, it is not necessary to transmit the entire interface. It is only required to transmit an identifier enabling the corresponding object to access the interface.

Further, a program may include instructions adapted to carry out one or a plurality of the above operations. A computer readable medium may be provided, in which a program is embodied, where the program is to make a computer execute one or a plurality of the above operations. A computer program product may comprise the computer readable medium.

According to another example, an adapter manager is provided for dynamic interface generation, including an adapter manager receiving module for receiving from a service object an adapter request at least including information on at least one offer-interface offered by the service object, and a request-interface demanded by a user object; an adapter manager determining module for obtaining an interface adapter from the request-interface to at least one of the at least one offer-interfaces offered by the service object; and adapter manager transmission module for transmitting at least information on the interface adapter to the service object for enabling the user object to access the service object.

According to a further embodiment, a service object for dynamic interface generation includes a service object receiving module for receiving from a user object a user request for a request-interface; a request generating module for generating an adapter request for transmission to an adapter manager, the adapter request at least including information on offer-interfaces, offered by the service object, and the request-interface; a service object transmission module for transmitting the adapter request to the adapter manager to instruct the adapter manager to obtain an interface adapter from the request-interface to at least one of the offer-interfaces at the service object; and wherein the service object receiving module is arranged to receive at least information on the interface adapter for enabling an access from the user object based on the interface adapter.

BRIEF DESCRIPTION OF THE DRAWINGS

FIG. 4 illustrates a user object, a service object and various elements for establishing communication according to another embodiment of the invention.

In the drawings and the following detailed description, elements with the same reference numeral are the same or equivalent elements.

DETAILED DESCRIPTION

Figure 1:
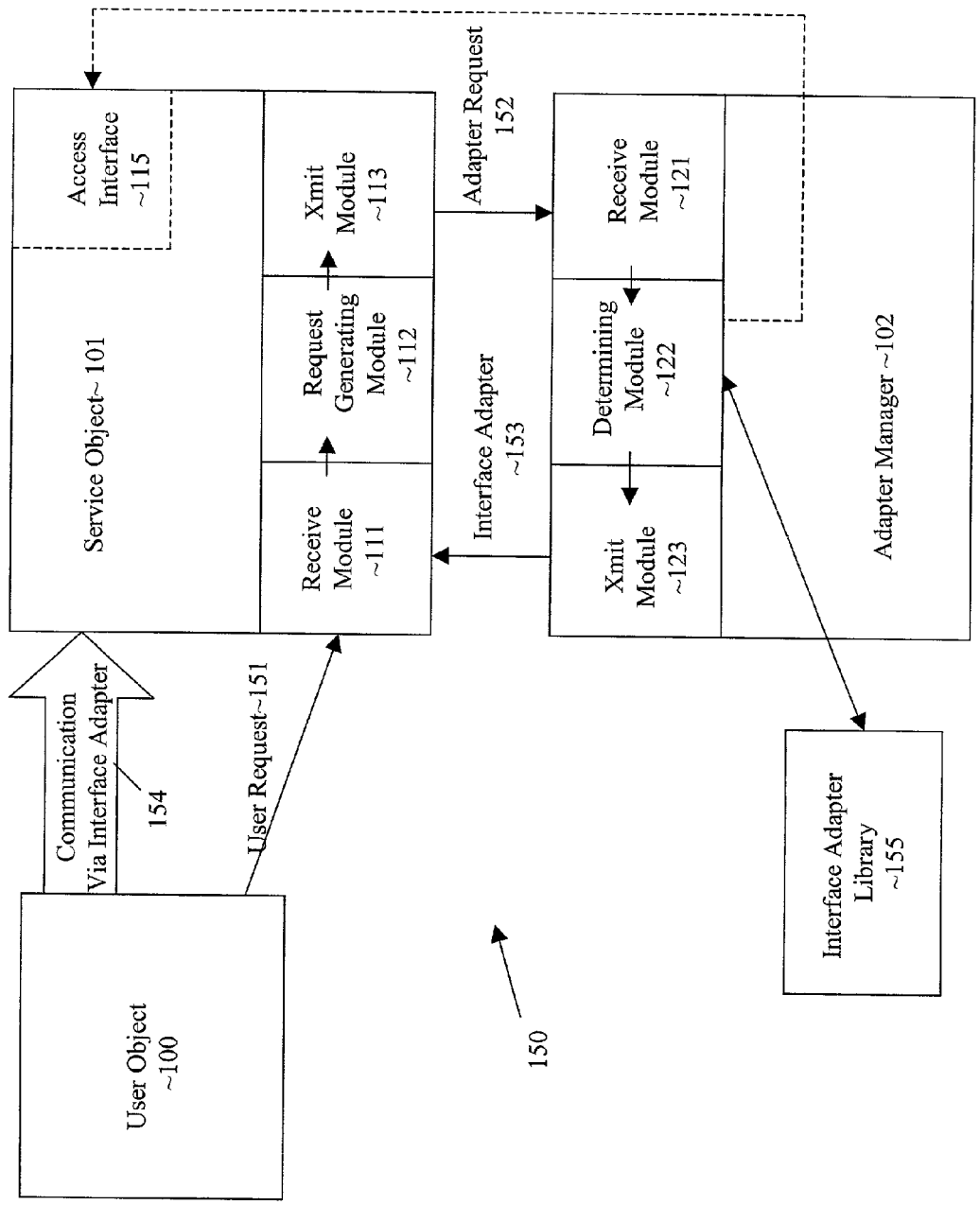
FIG. 1 shows a system for dynamic interface generation according to one embodiment of the invention.

FIG. 1 shows a system 150 for dynamic interface generation, according to an embodiment of the invention. System 150 allows a user object 100 to access a service object 101 through an interface adapter provided by an adapter manager 102. Hence, when user object 100 demands an interface that is not offered by service object 101 in an access request, service object 101 dynamically obtains an interface adapter from adapter manager 102 that allows user object 100 and service object 101 to communicate.

Hence with system 150, user object 100 is provided with the necessary interface adapter allowing user object 100 to actually access service object 101 even in cases where service object 101 did not initially offer the interface demanded by user object 100. Since the interface adapter is delivered by adapter manager 102 on demand in a runtime environment, it is no longer necessary that service object 101 provide all possible interfaces for all possible user objects accessing service object 101. Thus, complicated rewriting of code of service objects when updating parts of system 150, particularly user objects, is no longer necessary and so can be eliminated.

In this embodiment, service object 101 includes a service object receiving module 111. Service object receiving module 111 receives a user request 151 regarding a request-interface from user object 100. Herein, a module may be any means to realize the respective functionality, including software, hardware and combinations thereof.

Service object 101 also includes a request generating module 112 that is coupled to service object receiving module 111. Service object request generating module 112 generates an adapter request for transmission to adapter manager 102. The generated adapter request at least includes information on at least one offer-interface at service object 101, and on the request-interface.

The information on at least one offer-interface may include information on an access interface 115 at service object 101. Access interface 115 allows a determining module 122 in adapter manager 102 to access service object 101 to determine offer-interfaces available at service object 100, i.e. to determine whether a particular interface adapter fits an offer-interface offered by service object 101. Thus, the adapter request can include indirect information on the interfaces available at service object 101 in some embodiments.

After request generating module 112 generates the adapter request, adapter request 152 is transmitted from service object 101 to adapter manager 102 by a service object transmission module 113. Service object transmission module 113 is coupled to request generating module 112. Transmitted adapter request 152 instructs adapter manager 102 to obtain an interface adapter from the request-interface to at least one of the offer-interfaces at service object 101.

Adapter manager 102 includes an adapter manager receiving module 121. Adapter manager receiving module 121 receives adapter request 152 from service object 101. Adapter request 152 includes at least the information on at least one offer interface available at service object 101 and the request-interface requested by user object 100.

Adapter manager 102, in this embodiment, also includes an adapter manager determining module 122 that is coupled to adapter manager receiving module 121. Upon receiving adapter request 152 from module 121, module 122 obtains an interface adapter from the request-interface to at least one of the offer-interfaces at the service object 101. As explained more completely below, obtaining the interface adapter includes at least one of selecting, identifying, retrieving the interface adapter, and similar operations.

In one embodiment, interface adapters, which may be needed, have been previously written and stored for selection by adapter manager determining module 122 upon receiving an adapter request from service object 101. In this case, adapter manager determining module 122 is arranged to obtain the interface adapter from a library of interface adapters 155 accessible by adapter manager 102. Library 155 may be a database storing code sections of interface adapters, or alternatively may be a list of identifiers of interface adapters stored elsewhere, including, for example, addresses of interface adapters or pointers indicating storage locations of respective interface adapters.

An adapter manager transmission module 123 is also included in adapter manager 102. Module 223 transmits to service object 101 at least information on the interface adapter for enabling user object 100 to access service object 101, as explained more completely below. This may include transmission of the interface adapter itself, e.g., a code section forming the interface adapter, or may include transmission of an address or pointer indicating a storage location of the interface adapter.

Service object receiving module 111 is further arranged to receive an interface adapter 153 or information on interface adapter 153 from adapter manager 102. Received interface adapter 153 enables access to service object 101 by user object 100.

After receiving the information on interface adapter 153 from adapter manager 102, service object 101 notifies user object 100 with a message including information on received interface adapter 153. The information, for example may be the interface adapter itself, or an address or pointer indicating a storage location of the interface adapter.

The communication enabled between user object 100 and service object 101 via interface adapter 153 is illustrated by an arrow 154. Even though arrow 154 extends from the user object 100 to service object 101, bi-directional communication is possible. Therefore, one-directional arrow 154 is illustrative only and is not intended to limit the invention to any particular direction of communication.

System 150 for dynamic interface generation may be realized using one or a plurality of data processing devices, such as general purpose data processing devices, server data processing devices or client data processing devices, including dedicated hardware and similar. The individual elements, i.e. user object 100, service object 101, and adapter manager 102, may reside on a single data processing device or may be distributed onto a plurality of data processing devices.

In the following, examples of the elements of the system shown in FIG. 1 are described in further detail. It is noted that modifications of the following examples are still within the scope of the invention.

Service Object 101

Service object 101 typically is an object of an application program. Service object 101 provides a particular functionality during execution of the application program. The application program may be run by a user controlling a data processing device. An application program may for example be a personal data organizer, a text processor, an office application such as spread sheet applications, e-mail applications, or distributed applications such as home banking applications and distributed applications providing services in a client and server scenario.

Service object 101, in general, may provide any functionality within an application program, or may be an object providing functionality for a plurality of application programs sharing service object 101. For example, a plurality of application programs could be arranged to access a library of service objects providing standard functionality such as data input/output, visualization tools and similar functionality.

Service object 101 may be implemented as a software program or may be realized as a dedicated hardware device. Further, service object receiving module 111, service object request generating module 112 and service object transmission module 113 may form an integral part of service object 101 thereby providing service object 101 with the required data input/output and communication functionality. However, it is also possible that service object receiving module ill, service object request generating module 112 and service object transmission module 113 are realized on dedicated devices, including realized as hardware, and may reside on different physical entities in communication with service object 101.

Service object 101 includes one or a plurality of interfaces for communicating to other entities of system 150, such as further objects, e.g. user object 100. The interfaces (not shown) may be realized in software, forming an integral part of service object 101, or may be realized as dedicated devices, including hardware, and may reside on the same physical entity as service object 101 or may reside on different physical entities. Usually, interfaces are generated together with the object software program or object hardware and thus are closely linked to the service object itself.

Hardware interfaces are the plugs, sockets, wires and the electrical pulses traveling through the hardware interfaces in a particular pattern. Also included are electrical timing considerations. Examples are RS-232 transmission, the Ethernet and Token Ring network topologies and the IDE, ESDI, SCSI, ISA, EISA and Micro Channel interfaces.

Software or programming interfaces are the languages, codes and messages programs used to communicate with each other and to the hardware. Examples are the applications that run under an operating system as well as the SMTP e-mail and LU 6.2 communications protocols.

The interfaces of service object 101 allow other objects such as user object 100 to access service object 101 in accordance with predetermined rules specified by the interfaces offered by service object 101. Thus, another object, such as user object 100, can only communicate with service object 101, if service object 101 provides all required interfaces to the object wishing to access service object 101.

In a static situation, all needed interfaces for access by other objects are included in service object 101. Thus, all possible access scenarios are accommodated, or the user object is directly adapted to service object 101.

However, if requirements change, particularly if for example further objects are added to system 150 and wish to obtain services from service object 101, the interfaces available at service object 101 may not fit the need of a user object, such as user object 100. In the prior art in the case where the interfaces available at a service object did not fit the needs of a user object, the service object was not able to serve an access request from that user object. Consequently, it was necessary to rewrite the software making up the service object or to change existing hardware arrangements making up the service object.

However, with system 150, if a situation occurs, i.e., service object 101 is not able to provide an interface requested by user object 100, service object 101 generates an adapter request 152, and transmits adapter request 152 to adapter manager 102.

Adapter request 152 includes information on interfaces available at service object 101. This information is either direct information on the interfaces initially provided with service object 101, or indirect information on the interfaces available at service object 101. The indirect information allows adapter manager 102 to interrogate service object 101, to determine whether a particular interface is available. For example, adapter manager 102 could sequentially go through a list of interface adapters and could, for each one, interrogate service object 101, whether an offer interface is available, the offer interface at least fitting partially to the interface adapter.

Further, the adapter request includes information on a request-interface, which was requested in user request 151 that was received from user object 100. This information may be directly included in the adapter request, or indirectly included by naming a source, where information on the request-interface may be retrieved, e.g., user object 100.

In response to adapter request 152, adapter manager 102 provides an interface adapter and transmits the same to service object 101. The interface adapter is either transmitted physically, or an address specifying a storage location of the interface adapter is transmitted from adapter manager 102 to service object 101.

The interface adapter provides an adapter from the request-interface, requested by user object 100, and at least one of the interfaces available at service object 101. Upon receiving the interface adapter or information on the interface adapter, service object 101, in one embodiment, notifies user object 100, e.g. transmits an address specifying the storage location of the interface adapter to user object 100 to enable user object 100 to access service object 101 via the interface adapter, as illustrated by arrow 154.

Alternatively, in another embodiment, adapter manager 102 directly transmits information on the interface adapter to user object 100, e.g. in parallel with a transmission of information on the interface adapter to service object 101. In yet another embodiment, user object 100 generates the adapter request and uses an adapter received from adapter manager 102 to access service object 101.

User Object 100

User object 100 is generally constructed similar to service object 101, e.g., is an object of an application program that provides a certain functionality, or is an object, e.g. in a library of objects, providing functionality for a plurality of application programs. User object 100 may be part of the same application program as service object 101 or may be part of another application program. It is also possible that user object 100 is implemented in hardware, as described above for service object 101.

In executing certain operations to provide functionality within or for an application program, user object 100 is required to access service object 101, e.g. to obtain functionality provided by service object 101. Thus, user object 100 generates a user request, requesting a particular interface needed in the communication between user object 100 and service object 101. The transmission of the user request to service object 101 is represented in FIG. 1 by arrow 151.

If the particular interface needed is available at service object 101, the service may commence immediately. However, if the interface is not available, service object 101 must obtain the interface adapter, as described above.

As a practical example, user object 100 and service object 101 are, in one embodiment, part of an application program requiring the storage of data, e.g. a text processing application. In this case, user object 100 could be an object initializing the required storage operation, and service object 101 could be an object providing functionality in actually storing data.

In this example, user object 100 is required to transmit data to service object 101, e.g., data to be stored, or information on a location of data to be stored, and may include information on data formats and similar information. If service object 101 provides the necessary interface, user object 100 can directly access service object 101 through this interface and transmit the required data. However, if user object 100, for example, is updated by including a new data format or similar, and service object 101 is not updated in correspondence thereto, user object 100 may no longer be able to use the interface provided by service object 101.

In the case where user object 100 has been updated, user object 100 still requests an interface. However, the interface is unavailable at service object 101. Therefore, service object 101 obtains an interface adapter as described above, for adapting the interface required by the user object, e.g., the updated interface, to the interface provided by service object 101, i.e., the old interface which was not updated. Even though the above examples included distinct roles for user object 100 and service object 101, these roles can be reversed, i.e., the user object may function as the service object and vice versa.

Adapter Manager 102

Adapter manager 102, in one embodiment, is a software program that upon execution allows selecting interface adapters from a plurality of offer-interface adapters. Adapter manager 102 may be located on the same data processing device as service object 101 and/or user object 100. However, adapter manager 102 may also be located on a separate device, e.g. a dedicated adapter manager unit. It is further possible that adapter manager 102 is realized at least partially in hardware to speed up operations.

Adapter manager receiving module 121, adapter manager determining module 122 and adapter manager transmission module 123 may be formed as integral parts of adapter manager 102 or may be constituted by separate entities, e.g. software programs linked to adapter manager 102 or separate hardware devices linked to adapter manager 102. As explained above, adapter manager receiving module 121, adapter manager determining module 122 and adapter manager transmission module 123 provide the required functionality for receiving adapter requests from service objects, selecting interface adapters from offer-interface adapters and transmitting interface adapters to the service object and/or the user object, respectively.

Adapter manager determining module 122 selects an interface adapter from available interface adapters based on information received with the adapter request from service object 101. This information, in this embodiment, is either direct information or indirect information on the interface requested by user object 100 and the interface or interfaces available at service object 101, as described above.

Adapter manager determining module 122 performs the selection operation by searching for an interface adapter (i) offering the request-interface, requested by user object 100, and (ii) requiring at least one interface directly or indirectly available at service object 101. The interface adapters available to adapter manager 102 may be stored in library of interface adapters 155, for example in a memory of the system, a memory of a data processing device including adapter manager 102, or, library 155 may reside on a separate database.

While a single user object, service object and adapter manager are shown in FIG. 1, a plurality of user objects, service objects and adapter managers may be provided. It is possible that a plurality of adapter managers accesses the same library of interface adapters.

Communications between user object 100, service object 101 and adapter manager 102, i.e. the transmission of user request 151, of adapter request 152, of interface adapter 153 or information on the interface adapter, and communication 154 between user object 100 and service object 101 may be executed via a system bus, if all elements shown in FIG. 1 reside on a single data processing device, or may include further internal communications. If the elements shown in FIG. 1 reside on different physical entities, transmissions of the messages may be realized through local area networks or wide area networks connecting a plurality of data processing devices including one or more of the elements shown in FIG. 1, e.g. using packet switched communications, or, may include transmissions via dedicated communication links, including wireless transmissions.

For example, it is possible that user object 100 resides on a client data processing device and service object 101 and/or adapter manager 102 reside on a server data processing device. In this case, user request 151 and communication via interface adapter 154 may be realized including dedicated communication links or wireless communications.

Even though in the above example user object 100 only requests a single interface, further embodiments are possible, where user object 100 requests a plurality of interfaces with the user request, in which case adapter manager 102 selects one or a plurality of interface adapters for providing communication between user object 100 and service object 101.

These embodiments of the invention offer a solution to the problem of avoiding changing existing code and/or providing very large numbers of derivations of interfaces to accommodate all possible cases of communications between objects of an application program or a plurality of application programs. These embodiments allow creation of the required interface adapter implementations at runtime on demand, i.e. during the execution of an application program or a plurality of application programs upon request by a user object. This is achieved through aggregation of the interface adapter object.

An interface adapter may either be directly obtained from a library or an interface adapter implementation may be modified by adapter manager 102 to provide the required interface adapter. Thus, the interface adapters are aggregated to service object 101 by adapter manager 102 on demand during runtime. Aggregation means the coupling of an object implementation, e.g. a service object, with one or more partial or other object (dependent) implementations in a way that the newly created object behaves like a single object to an environment, e.g. the user object requesting access to the service object. Thus, an interface adapter coupled to the service object reacts as a single object.

An interface adapter may also be a partially or fully implemented object and use the interfaces offered by the aggregator, e.g. service object 101, and which offers new interfaces for the created aggregate, e.g., the request-interface demanded by user object 100. The aggregate thus is the combination of service object 101 and the provided interface adapter, which behaves as a single object from the viewpoint of user object 100.

Thus, when a new interface is needed from service object 101, a method such as, for example, method XInterface::queryInterface is called. With this method, service object 101 checks its own list of implemented interfaces to determine whether service object 101 supports the request-interface.

The method returns a NULL pointer to service object 101, if the request-interface is not supported. In this case, service object 101 calls adapter manager 102. Adapter manager 102 checks whether there is an interface adapter in a library, which implements the required interface, i.e. the interface requested by the user object, based on the interfaces offered by service object 101 and its static aggregates, as well as previous dynamically aggregated interfaces, i.e. interface adapters.

The interface adapters in the library may be specified by a list of interface adapter offered interfaces and a list of interface adapter needed interfaces. Thus, for example, a simple interface adapter, which implements an interface XIndexAccess based on an interface XNameAccess, is specified in the list as (XIndexAccess)/(XNameAccess). If service object 101 implements interface XNameAccess, but not interface XIndexAccess, adapter manager 102 selects an interface adapter that emulates interface XIndexAccess onto interface XNameAccess that is offered by service object 101 when the request-interface is interface XIndexAccess.

An advanced adapter manager is even able to use an indirect specification to find interface adapters. For example, in this case an interface XNameAccess could be emulated based on an interface XIndexAccess. However, in this case the sub-objects accessible by interface XIndexAccess all have to offer a method XName to make such an interface adapter possible. In other words, a required functionality may be accessed indirectly through an interface adapter to a method, which allows access to the required functionality.

Objects, which do not use an adapter manager, in implementation of method XInterface::queryInterface, so-called legacy objects, are aggregated themselves within a factory which changes each object to an aggregator, e.g. a service object, which uses adapter manager 102. The minimum requirement, in this case, is only that the object itself can be aggregated. This is particularly useful to hide API (application program interface) changes without overloading new implementations of objects with support of old interfaces.

An API is a language and message format used by an application program to communicate with the operating system or some other system or controlled program such as a database management system or communications protocol. APIs are implemented by writing function calls in a program, which provide a linkage to the required subroutine for execution. Thus, an API implies that some program module is available in the computer to perform the operation or that some program module must be linked to the existing program to perform the tasks. Aggregating objects to use adapter manager 102 is also useful to make components useable in different API environments, for example OpenOffice.org API and Bonobo.

A computer-readable medium may be provided having a program recorded thereon, where the program is to make a computer or system of data processing devices execute functions or operations of the features and elements of the above-described embodiments of this invention. A computer-readable medium includes not only a magnetic or optical or other tangible medium on which a program is recorded, but also a signal, e.g., analog or digital, electromagnetic or optical, in which the program is embodied for transmission. Further, a computer program product may be provided comprising the computer-readable medium.

Figure 2:
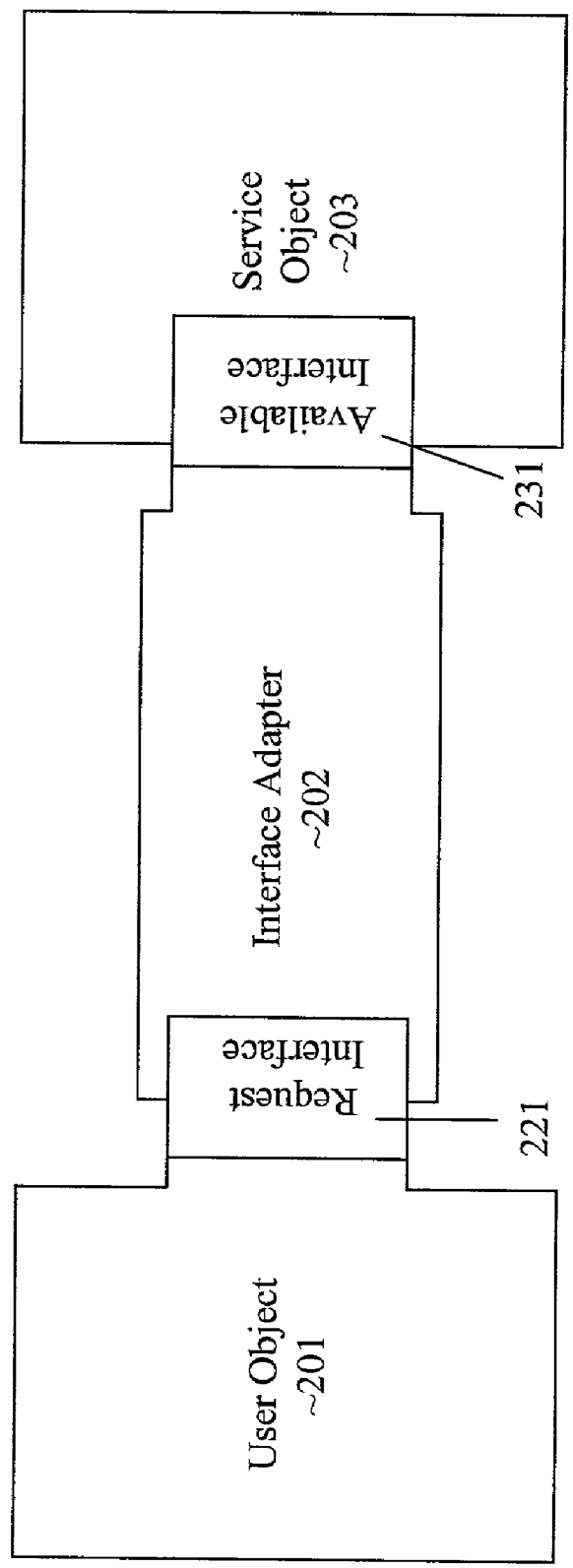
FIG. 2 shows a combination of a user object, an interface adapter, and a service object illustrating the application of interface adapters according to an embodiment of the invention.

FIG. 2 shows in more detail of a dynamic arrangement of a user object 201, an interface adapter 202 and a service object 203 according to another embodiment of the invention. The arrangement of FIG. 2 is generated in a runtime environment on demand using for example system 150.

The example of FIG. 2 shows an interface adapter provided by an adapter manager such as adapter manager 102 of FIG. 1. Interface adapter 202 is arranged between user object 201 and service object 203 for communication between user object 201 and service object 203. This communication may involve a transmission of data only from user object 201 to service object 203 via interface adapter 202, or may include a bi-directional communication, e.g. for feedback from service object 203 to user object 201.

One embodiment of user object 201, interface adapter 202 and a service object 203 is similar to the one described above with respect to FIG. 1. However the embodiment of FIG. 2 is not limited thereto.

A request-interface 221 is an interface requested by user object 201 to use in accessing service object 203. Request-interface 221 is an interface that is offered by interface adapter 202.

A service object offer-interface 231 constitutes an interface available at service object 203 for accessing service object 203. Offer-interface 231 may constitute one of a plurality of interfaces available at service object 203.

As shown in the example of FIG. 2, request-interface 221 between user object 201 and interface adapter 202, in this embodiment, is part of interface adapter 202, i.e. request-interface 221 constitutes an interface, which is offered by interface adapter 221.

Further, service object offer-interface 231 between interface adapter 202 and service object 203 is an interface available at service object 203, i.e., constitutes an integral part of service object 203. Accordingly, offer-interface 231 is an interface, which is required by interface adapter 202.

To facilitate the selection process of interface adapters from a library of interface adapters, potentially having a large number of interface adapters, each interface adapter, in one embodiment, is defined by an offer-interface and a required interface. The interface adapter required interface is sometimes referred to as a needed interface. For the example of FIG. 2, the offer-interface of interface adapter 202 is request-interface 221 of user object 201. The required interface of interface adapter 202 is service object offer-interface 231 that is available at service object 203.

Thus, if the adapter manager such as adapter manager 102 receives an adapter request specifying a request-interface and at least one offer-interface, adapter manager 102 searches for an interface adapter providing request-interface 221 as an offer-interface of the interface adapter, and requiring offer-interface 231 of service object 203. It is possible that an interface adapter has more than one offered interface and provides for more than one required interface, to fit a single request-interface of a user object and at least one offer-interface of a service object.

FIG. 2 only shows a schematic arrangement of user object 201, interface adapter 202 and service object 203, while in practical applications interface adapter 202 may not necessarily be physically linked to service object 203 and user object 201. Instead, interface adapter 202 may be provided from adapter manager 102 to service object 203 by transmitting a pointer indicating an address location storing a code section constituting interface adapter 202.

Further, interface adapter 202 may be made available to user object 201 for accessing service object 203 by transmitting from service object 203 to user object 201 address information such as a pointer indicating a storage location of interface adapter 202. Thus, in a software environment, the necessary data transmissions may be kept at a minimum, e.g., only addresses need to be transmitted for providing interface adapter 202 between user object 202 and service object 203.

Figure 3:
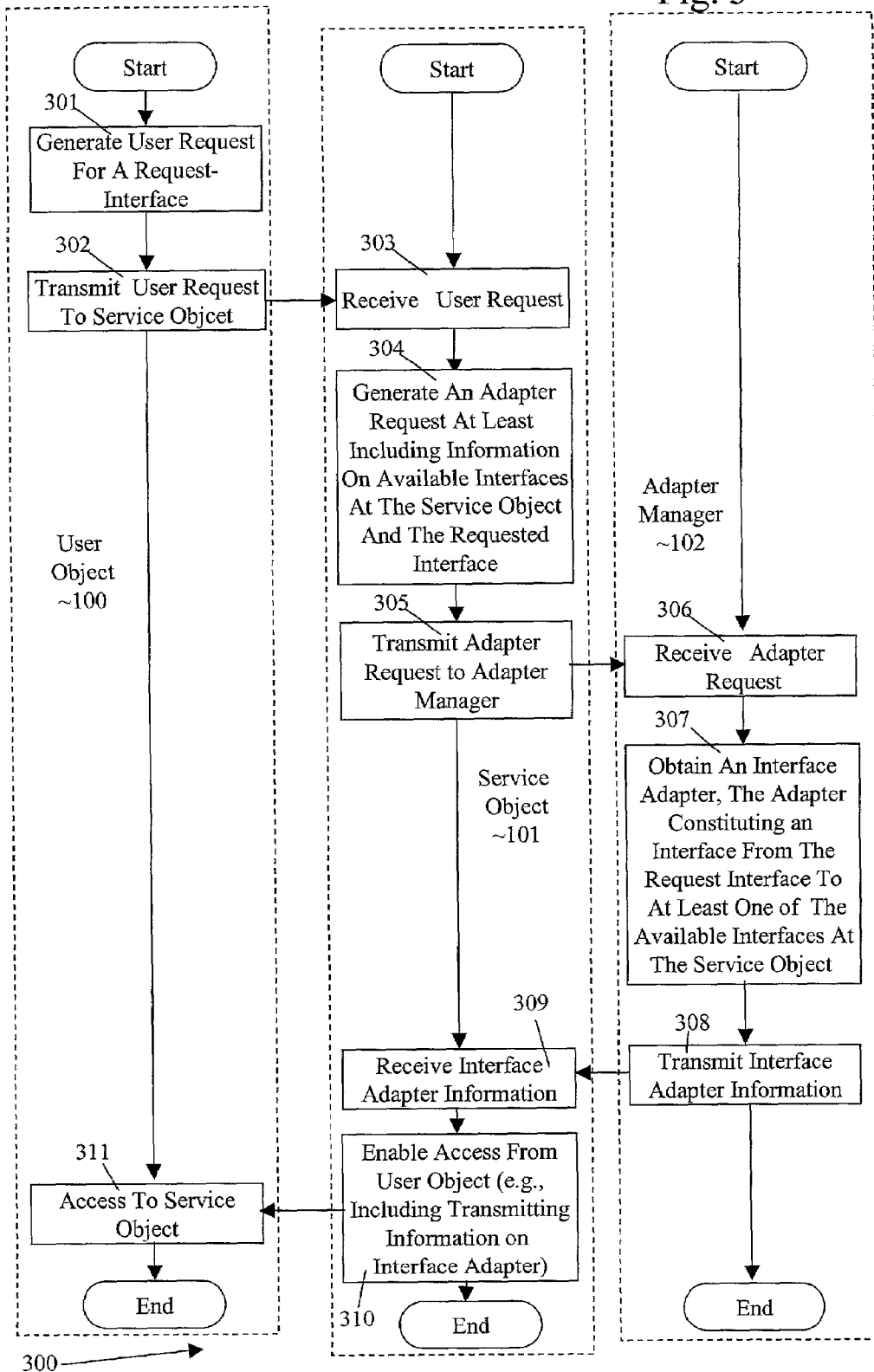
FIG. 3 illustrates operations at a user object, a service object and an adapter manager according to another embodiment of the invention.

FIG. 3 illustrates one embodiment of a dynamic interface generation process 300 that is executed at user object 100, a service object 101 and adapter manager 102. While operations shown in FIG. 3 are executed using system 150 (FIG. 1), the embodiment of FIG. 3 is not limited thereto.

In a first operation 301 at user object 100, a user request is generated for a request-interface. The request is generated at user object 100 upon determining that functionality provided by service object 101 is required. The request-interface specified in the user request is an interface needed for communicating with service object 101 to obtain the desired functionality from service object 101.

The user request includes, in one embodiment, information on the request-interface, such as a specification of the request-interface, or an identifier of the request-interface, such as a unique identifier assigned to the request-interface beforehand. The user request generated at user object 100 in operation 301 may further include information on user object 100, e.g. an identifier of user object 100, to notify service object 101 about the identity of user object 100.

In an operation 302, user object 100 transmits user request 151 to service object 101, where the user request is received in an operation 303. The transmission may be performed as described above with respect to previous embodiments. In one embodiment operation 303 is performed by receive module 111 of service object 101.

In an operation 304, request generating module 112 of service object 101 generates an adapter request. The adapter request at least includes information on service object offer-interfaces, i.e. interfaces available at the service object, and information on the request-interface. The adapter request generated in operation 304 may further include information identifying service object 101, such as an address of service object 101 or another unique identifier.

In an operation 305, the adapter request is transmitted from transmit module 113 of service object 101 to receive module 121 of adapter manager 102. The adapter request is received by adapter manager 102 in an operation 306. The transmission of the adapter request, including direct or indirect information on the offer-interfaces at service object 101, may be performed as described above with respect to previous embodiments.

At adapter manager 102, in an operation 307, an interface adapter is obtained by determining module 122. The interface adapter includes an interface from the request-interface to at least one of the offer-interfaces available at service object 101.

Since service object 101 may have a plurality of interfaces through which the required functionality may be accessed or obtained, not all interfaces available at service object 101 need to be considered in interface adapter selection operation 307. All that is required is that the interface adapter provides the request-interface, i.e. the interface requested by user object 100, and can connect to at least one of the offer-interfaces at service object 101. The interface adapter may be obtained as described above with respect to previous embodiments.

In an operation 308, the interface adapter is transmitted from transmit module 123 of adapter manager 102 to receive module 111 of service object 101. The transmitted interface adapter is received by service object 101 in an operation 309. The transmission of the interface adapter may be performed as described above with respect to previous embodiments.

At service object 101, in operations 310 and 311, a service session between user object 100 and service object 101 is enabled. For example, user object 100 is enabled to access service object 101 through the interface adapter. More particularly, user object 100 accesses service object 101 through the request-interface, i.e. the interface needed by user object 100, the interface adapter, and the at least one interface available at service object 101.

Access from user object 100 to service object 101 via the interface adapter may be enabled by transmitting information specifying the interface adapter, such as address information or a pointer identifying a storage location of the interface adapter, to the user object.

Thereafter, the flow ends or further access sequences from user objects to service objects may be performed including cases where the user object and the service object change their roles, i.e., wherein the user object functions as service object and the service object functions as user object.

As described above, interface adapters, providing the required functionality to allow different objects to communicate with one another, are obtained through adapter manager 102 on demand, e.g. in a runtime environment, and transmitted to service object 101 to provide service object 101 with the required interface functionality to serve user object 100.

Thus, interface adapters, providing the required functionality to allow different objects to access one another, may be obtained through adapter manager 102 on demand. Since the adapter request includes the necessary information on the request-interface and the interfaces offered by service object 101, adapter manager 102 obtains an appropriate interface adapter, which for example may be previously coded and stored at a location accessible by adapter manager 102.

FIG. 4 illustrates a further arrangement of a user object 401, interface adapters 403 and 404, and a service object 402, according to another embodiment of the invention. FIG. 4 illustrates a plurality of interface arrangements between user object 401 and service object 402 that enable user object 401 to access service object 402. The shown example of user object, interface adapters 403 and 404 and service object 402 may be provided using system 150 of FIG. 1. However, the embodiment of FIG. 4 is not limited thereto.

User object 401 is similar to the user object described above. User object 401 demands a request-interface. Service object 402 also is similar to the service objects described above. Service object 402 has at least one offer-interface available.

A first interface adapter 403 between user object 401 and service object 402 includes an offer interface 431, fitting at least part of the request-interface requested by user object 401. Interface adapter offer interface 431 enables partial access from user object 401 to service object 402. Service object 402 includes an offer-interface 421 constituting an interface required by interface adapter 403.

Moreover, a service object offer-interface 411 available at service object 402 fits at least part of the request-interface requested by user object 401. Offer-interface 411 provides partial direct access from user object 401 to service object 402.

Interface adapter 404 is a composite interface adapter. Composite interface adapter 404 fits another part of the request-interface. Composite interface adapter 404 allows partial access from user object 401 to service object 402. Composite interface adapter 404 includes a first interface adapter 405 and a second interface adapter 406. These two interface adapters 405 and 406 are termed partial interface adapters. Partial interface adapters 405 and 406 are connected in series to form one interface adapter, i.e. composite interface adapter 404.

First partial interface adapter 405 includes an offer interface 451, which fits part of the request-interface requested by user object 401, and a required interface 461. Interface 461 is an intermediate interface that is an offered interface of second partial interface adapter 406. Further, second partial interface adapter 406 has a required interface, offer-interface 422 available at service object 402.

Differing from the examples illustrated with respect to FIG. 2, the example of FIG. 4 shows various alternatives for providing access from user object 401 to service object 402.

A user object usually only requests a single request-interface, and this request-interface may be subdivided into the three logical entities illustrated by three protruding portions 441, 442 and 443 at user object 401. However, it is also possible that the user object requests a plurality of request-interfaces, e.g. three different request-interfaces in the example of FIG. 4.

In the example of FIG. 4, a first part of the request-interface, or alternatively a first request-interface, can be directly served by an interface, interface 411 that is available at the service object 402. Upon receiving the user request requesting the interface from the service object, service object 403 determines that at least part of the request-interface can be accommodated by interface 411, which is available at service object 402. Thus, a direct service for this particular part of the request-interface can be performed.

Further, a second part of the request-interface, or alternatively a second request-interface, is accommodated by interface adapter 403. Interface adapter 403 includes offered interface 431 that allows accommodation of a second part of the request-interface by fitting to the second part of the request-interface requested by user object 401. Interface adapter 403 connects to offer-interface 421 that is available at service object 402.

Thus, similar to the example of FIG. 2, interface adapter 403 is provided from user object 401 to service object 402. However, in this case, interface adapter 403 is for only a part of the request-interface to an offer-interface at service object 402, or a plurality of offer-interfaces at the service object 402.

Further, in the example shown in FIG. 4, a third logical part of the request-interface, or alternatively a third request-interface, is accommodated by composite interface adapter 404. Composite interface adapter 404 connects to offer-interface 422 that is available at service object 402.

As explained above, composite interface adapter 404 includes a series connection of two partial interface adapters 405 and 406. Partial interface adapters 405 and 406 are each an interface adapter. Adapters 405 and 406 are referred to as partial interface adapters to indicate that each forms a part of a composite interface adapter.

First partial interface adapter 405 and second partial interface adapter 406 are connected in series through an intermediate interface 461. Thus, intermediate interface 461 constitutes an interface required by first partial interface adapter 405 and constitutes an interface offered by second partial interface adapter 406.

Accordingly, the third part of the request-interface is accommodated by composite interface adapter 404 connecting the third part of the request-interface via interface 451 offered by first partial interface adapter 405, intermediate interface 461 offered by second partial interface adapter 406 and interface 422 constituting an interface available at service object 402.

In general, if an appropriate interface adapter cannot be found by an adapter manager, an adapter manager determining module, such as adapter manager determining module 122 (FIG. 1), generates a composite interface adapter based on a plurality of interface adapters, i.e., first and second interface adapters 405 and 406. In this case, adapter manager 102 still receives an adapter request specifying a request-interface and offer-interfaces at service object 402, but, if a direct interface adapter is unavailable, adapter manager 102, in this embodiment, concatenates a plurality of interface adapters to provide the required bridge from the request-interface to the at least one interface available at service object 402.

The example of FIG. 4 is illustrative only. Other arrangements are possible. For example, (a) a plurality of composite interface adapters, (b) a plurality of interface adapters such as interface adapter 403, and/or (c) a plurality of direct interface connections, i.e. through interfaces such as interface 411 that is available at service object 402, may be provided.

Adapter manager 102, once it has aggregated a composite interface adapter, adds the composite interface adapter to library of interface adapters 155. This avoids a repeated aggregation of interface adapters upon adapter requests from service objects.

A composite interface adapter added to library 155 is defined exactly as a direct interface adapter, i.e. by an offered interface, in the present case interface 451, and required interfaces, in the present case of FIG. 4, offer-interface 422 of service object 402. Thus, once a composite interface adapter is stored in library of interface adapters 155, the composite interface adapter is handled exactly as a direct interface adapter.

However, since the composite interface adapter connects at least two partial interface adapters, processing complexity is usually higher than using a single interface adapter, sometimes called a direct interface adapter. Therefore, adapter manager 102 stores a classifier in association with the composite interface adapter. The classifier indicates that the interface adapter is a composite interface adapter.

Further, in one embodiment, the composite interface adapter may be selected from the library of interface adapters only if a corresponding interface adapter with a corresponding at least one offer-interface and request-interface does not exist. Hence, a sub-optimal interface adapter, i.e. a composite interface adapter, is selected from library of interface adapters 155 by an adapter manager determining module only if an equivalent non-composite interface adapter does not exist.

In another embodiment, a classifier is stored with each interface adapter stored in library of interface adapters 155, i.e. not only in connection with composite interface adapters. If a plurality of interface adapters is generally available to serve a specific interface adapter request from a service object, adapter manager 102 selects a most suitable interface adapter. For example, the classifiers could specify qualities such as computational complexity of the respective interface adapter, could specify a version number and so on.

FIGS. 5A to 5D illustrate different interface adapters from a user object to a service object according to other embodiments of the invention. In particular, FIG. 5A to 5D show four arrangements of a user object, an interface adapter and a service object. In FIGS. 5A to 5D user objects 511 to 514 are schematically illustrated on the left side, service objects 521 to 524 are schematically illustrated on the respective right side, and the user object and the service object is each figure is connected by at least one interface adapter, schematically illustrated by straight lines.

The examples of FIGS. 5A to 5D show different compositions of interface adapters from a respective request-interface, i.e. from an interface requested by a user object, to at least one offer-interface at the respective service object. As outlined with respect to the previous embodiments, the interface adapters of FIGS. 5A to 5D enable the respective user objects to access the respective service objects, which may involve a one directional transmission of data from the user objects to the service objects, but may include also return messages transmitted from the service objects to the user objects.

Figure 5A:
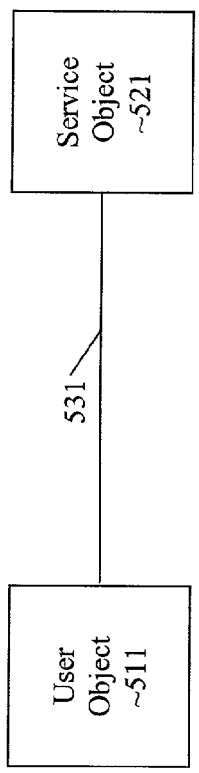
FIGS. 5A to 5D show examples of interface adapters according to another embodiment of the invention.

In the first example of FIG. 5A, a user object 511 is schematically illustrated on the left side, and a service object 521 is schematically illustrated on the right side. An interface adapter 531 shown by a straight line between user object 511 and service object 521 enables user object 511 to access service object 521. Interface adapter 531 may be obtained by an adapter manager, as described above with respect to previous embodiments.

In one embodiment, interface adapter 531 is a direct interface adapter, as for example described with respect to FIG. 2. Interface adapter 531 provides a connection from a request-interface, requested from user object 511, to at least one of at least one offer-interface available at service object 521. However, in another embodiment, interface adapter 531 provides a connection from a plurality of request-interfaces, requested by user object 511 to service object 521.

Figure 5B:
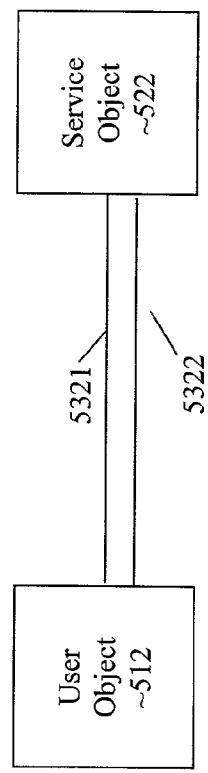

In the second example of FIG. 5B, a user object 512 is illustrated on the left-hand side and a service object 522 is illustrated on the right-hand side. Two interface adapters 5321 and 5322 are illustrated by parallel straight lines between user object 512 and service object 522.

Interface adapters 5321 and 5322 connect from a request-interface, requested at user object 512 to one offer-interface, available at service object 522. For example, the interface adapters 5321 and 5322 may each connect from a part of the request-interface to a part of the offer-interface. In another embodiment, interface adapters 5321 and 5322 connect from multiple request-interfaces to multiple offer-interfaces. Interface adapters 5321 and 5322 constitute a composite interface adapter, similar to the composite interface adapters outlined with respect to previous embodiments.

Figure 5C:
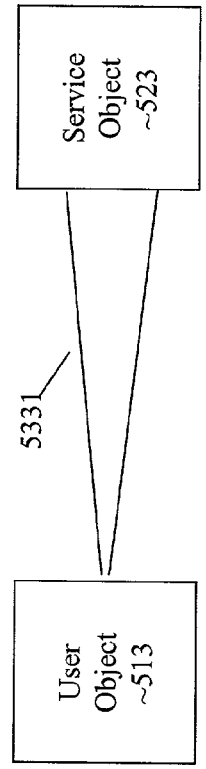

The example of FIG. 5C illustrates a user object 513 on the left-hand side and a service object 523 on the right-hand side. Here, one interface adapter 5331 connects from user object 513 to service object 523. However, differing from the example of FIG. 5A, interface adapter 5331 uses two offered interfaces at service object 523. Interface adapter 5331 connects a first part of the request-interface to a first offer-interface, or to a first set of offer-interfaces at service object 523. Interface adapter 5331 connects another part of the request interface to a second offer-interface, or a second set of offer-interfaces at service object 523. As in the example of FIG. 5B, interface adapter 5331 also constitutes a composite interface adapter where a single interface adapter is implemented based on multiple offer interfaces.

Figure 5D:
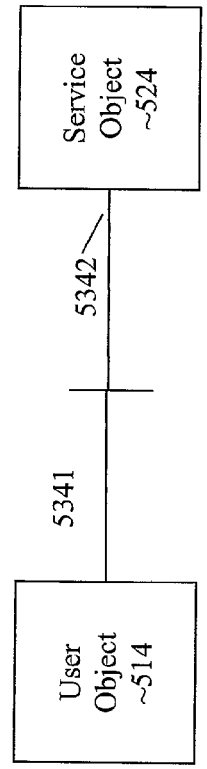

In the example of FIG. 5D, a user object 514 and a service object 524 are illustrated on the left-hand side and right-hand side, respectively. In this case two interface adapters 5341 and 5342 are concatenated to connect from user object 514 to the service object 524. For example, interface adapter 5341 connects from a request-interface, requested at the user object 514, to at least one intermediate interface, and interface adapter 5342 connects from the at least one intermediate interface to at least one offer-interface, available at the service object 524. Thus, the interface adapters 5341 and 5342 constitute a composite interface adapter, such as described above with respect to previous embodiments, e.g. composite interface adapter 404 shown in FIG. 4.

While in FIGS. 5A to 5D, the interface adapters are shown in individual examples, these individual examples of interface adapters may be combined with one another, e.g. to form combinations of the interface adapters or composite interface adapters of the examples of FIGS. 5A to 5D. Thus, composite interface adapters based on a combination of the above examples may be provided, i.e., combining direct interface adapters and/or composite interface adapters with parallel connection of direct interface adapters and/or composite interface adapters and composite interface adapters with series connection of interface adapters and combinations thereof.

Figure 6:
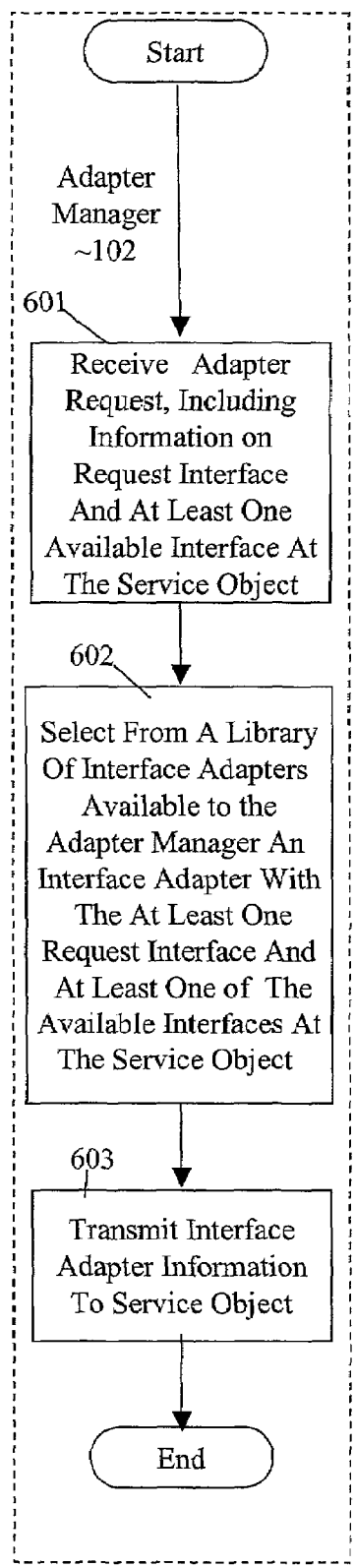
FIG. 6 shows operations executed at the adapter manager according to one embodiment of the invention.

FIG. 6 illustrates operations of adapter manager 102 according to another embodiment of the invention, particularly illustrating operations to select interface adapters. The operations of FIG. 6 may be carried out by system 150 shown in FIG. 1. However, the embodiment of FIG. 6 is not limited thereto.

In a first operation 601, receiving module 121 of adapter manager 102 receives an adapter request, for example from a service object such as service object 101 (FIG. 1). The adapter request includes information on at least one request-interface, requested by user object 100 and information on at least one offer-interface, available at service object 101.

In an operation 602, determining module 122 of adapter manager 102 selects, from a library of interface adapters 155 available to adapter manager 102, an interface adapter connecting from the at least one request-interface to the at least one offer-interface. Since the interface adapters in the library are defined, in this embodiment, by a list of respectively offered interfaces and a list of respectively needed interfaces, adapter manager 102 selects an interface adapter with a list of offered interfaces matching the request-interfaces and with a list of needed interfaces, matching the service object offer-interfaces that are available at the service object. Ideally, the identified interface adapter connects from all request-interfaces to all offer-interfaces, or subgroups thereof.

If adapter manager 102 determines that more than one adapter is available, adapter manager 102 may select one of the interface adapters based on classifiers stored in connection with the interface adapters. The classifiers specify qualities of the respective interface adapters, such as computational complexity, creation date, memory usage, programming language and binary compatibility, i.e. same system environment, or may indicate whether the interface adapter is a composite interface adapter, as outlined before, and so forth. Based on the classifiers, adapter manager 102 selects the best available interface adapter.

In an operation 603 the interface adapter selected by adapter manager 102 is transmitted to service object 101, e.g. as outlined with respect to previous embodiments. For example, a pointer indicating a storage location of the selected interface adapter is transmitted to service object 101. Service object 101 then notifies user object 100 by forwarding the pointer to the interface adapter. Thus, user object 100 is enabled to access service object 101. Thereafter the flow ends, or further interface adapters are selected for further user requests.

Figure 7:
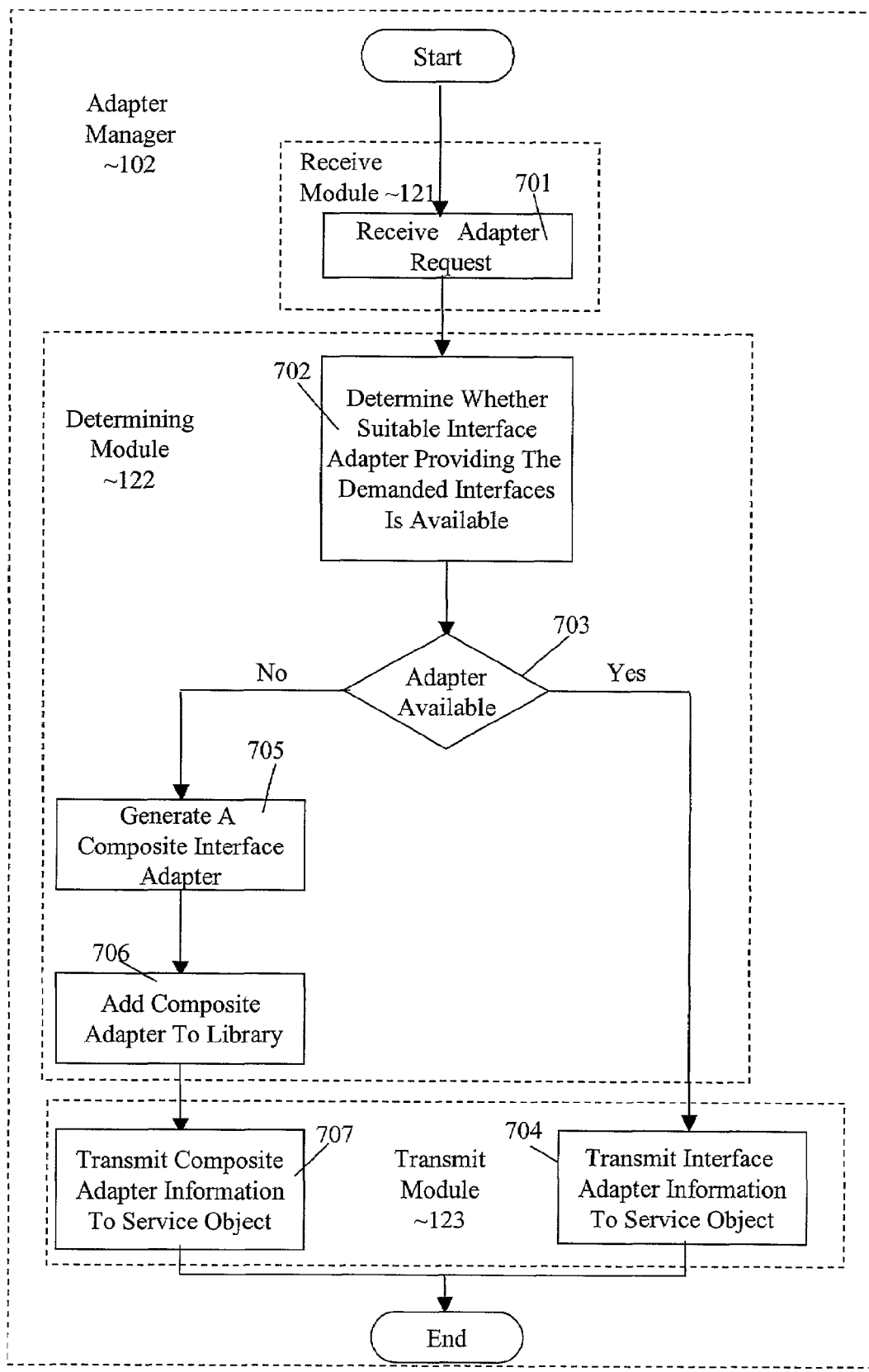
FIG. 7 shows operations at an adapter manager according to another embodiment of the invention.

FIG. 7 illustrates operations at an adapter manager 102, particularly showing operations for generating a composite interface adapter, according to another embodiment of the invention. While the operations shown in FIG. 7 are described as being carried out using the system 150 (FIG. 1), the embodiment of FIG. 7 is not limited thereto.

In a first operation 701, adapter manager 102 again receives an adapter request from service object 101. In an operation 702, adapter manager 102 determines whether a suitable adapter from the at least one request-interface to the at least one offer-interface is included in library of interface adapters 155. This operation may be performed as for example described above with respect to FIG. 6.

Operation 703 determines whether a suitable interface adapter is available. If in operation 703 the decision is "YES", operation 704 transmits the interface adapter information to service object 101, as for example described above.

If in operation 703 the decision is "NO", indicating that a suitable interface adapter is not available, in an operation 705, adapter manager 102 aggregates a composite interface adapter based on a plurality of partial interface adapters. The interface adapters used to form the composite interface adapter are interface adapters stored in library of interface adapters 155 and can include composite interface adapters, as for example described above with respect to FIG. 5.

The composite interface adapter is generated by combining the individual interface adapters of the composite interface adapter to form a single object, which behaves like a single object to an environment. The aggregation of interface adapters to form a composite interface adapter may also involve adding for example a code section for combining the interface adapters, the code section being generated or obtained by adapter manager 102.

In an operation 706, the composite interface adapter is added to library of interface adapters 155, and thus the generated composite interface adapter is available for further adapter requests. This composite interface adapter may itself again form part of a further composite interface adapter, generated upon further adapter requests. A classifier, which is stored in connection with the interface adapters, reflects the nature of the composite interface adapter, whether the composite interface adapter includes further composite interface adapters, and so forth.

In an operation 707, the composite interface adapter is transmitted to service object 101, e.g. by transmitting a single address or pointer to service object 101, or by transmitting a plurality of pointers or addresses to service object 101. In one embodiment, however, as the composite interface adapter acts as a single object to the environment, a single address is transmitted. Thereafter, i.e. after operation 707 and 704 the flow ends, or further adapter requests are processed by adapter manager 102.

While the above operations have been outlined in a specific sequence, a variation of this sequence within reason is possible. For example, operation 706 may be performed at another point in time.

In a further embodiment, adapter manager 102 selects an interface adapter based on indirect specifications. In this case, an interface could be emulated based on another interface, if the corresponding sub-objects accessible by the underlying interface make such an interface adapter possible.

For example, the adapter request from service object 101 includes information on data or types of data available at service object 101, and based thereon, adapter manager 102 selects an indirect adapter. Specifically, adapter manager 102 selects an interface adapter based on the information on the data or types of data with the user request. The indirect adapter allows user object 100 to access the data at service object 101 through the at least one interface available at service object 101.

Figure 8:
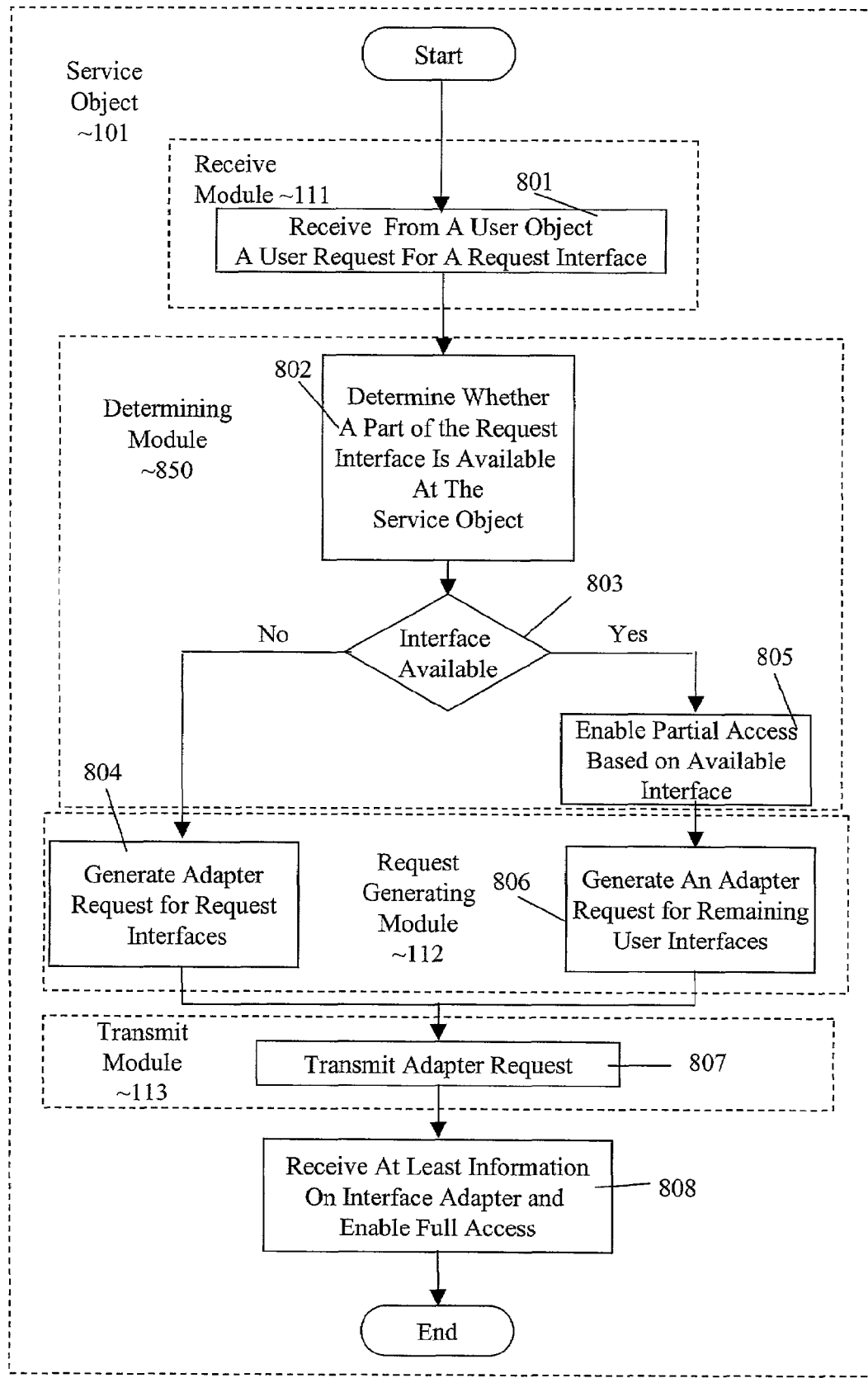
FIG. 8 illustrates operations at a service object according to one embodiment of the invention.

FIG. 8 illustrates operations at a service object according to another embodiment of the invention. While the operations of FIG. 8 are described as being executed by system 150 (FIG. 1), the embodiment of FIG. 8 is not limited thereto.

The embodiment of FIG. 8 particularly illustrates how interfaces available at service object 101 are directly used for connecting to user object 100, in addition to obtaining an interface adapter through adapter manager 102.

In a first operation 801, receive module 111 of service object 101 receives from user object 100 a user request for at least one request-interface, as for example described above with respect to previous embodiments. In an operation 802, a determining module 850 of service object 101 determines whether at least a part of the requested at least one interface is available at service object 101.

Operation 803 determines whether operation 802 was successful and such an interface is available at service object 101. If in operation 803 the decision is "NO", indicating that such an interface is not available, in an operation 804, request generating module 112 of service object 101 generates an adapter request for the at least one request-interface, for example as described above with respect to previous embodiments. If in operation 803 the decision is "YES", indicating that operation 802 identified that a part of the request-interface is available, in an operation 805, user object 100 is enabled to access the service object based on the interface identified in operation 802. See for example, interface 411 in FIG. 4 and the description thereof.

In an operation 806 following operation 805, request generating module 112 of service object 101 then generates an adapter request for the remaining part of the request-interface, or the remaining request-interfaces, requested by user object 100. Operation 806 is equivalent to the operations described above and those descriptions are incorporated herein by reference.

After operations 804 and 806 in an operation 807, transmitting module 113 of service object 101 sends the adapter request to adapter manager 102. Finally, in operation 808, the interface adapter is received from the adapter manager and full access is enabled to service object 101. Accordingly, with the operations outlined in FIG. 8, offer-interfaces at service object 101 are directly used for enabling at least partial access to service object 101 by user object 100.

While the above operations have been described in a specific sequence, a variation of this sequence within reason is possible. For example operation 805 may be performed concurrently with operation 808.

Figure 9:
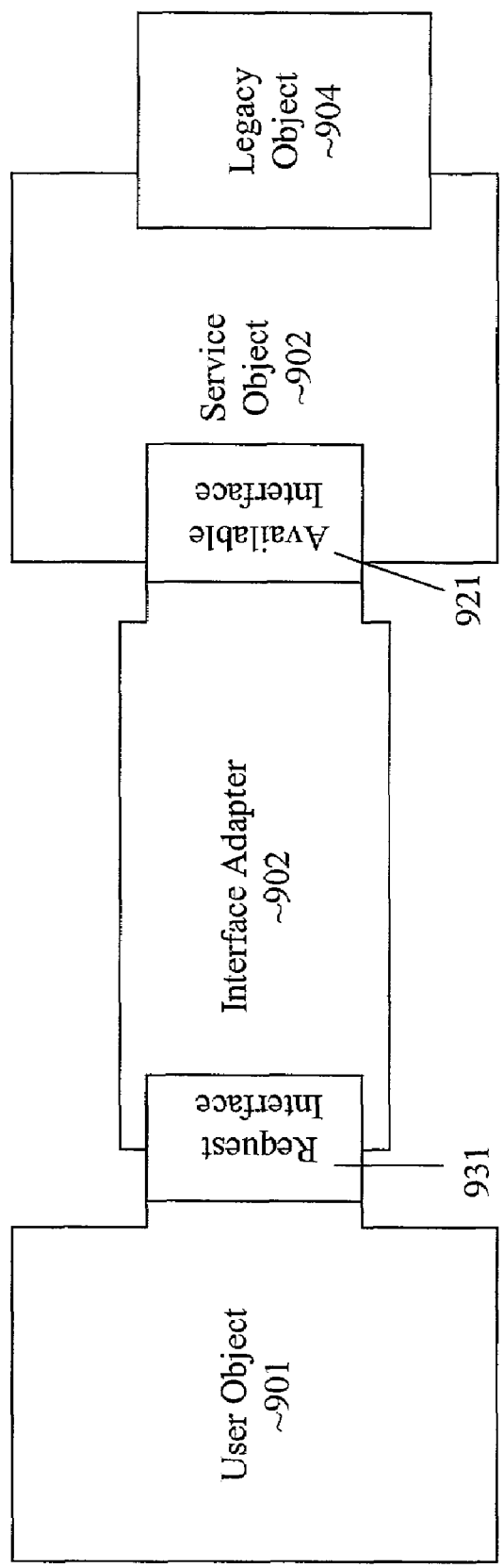
FIG. 9 illustrates a user object and a service object, the service object wrapping a legacy object according to one embodiment of the invention.

FIG. 9 illustrates an embodiment where the functionality of the dynamic interface generation is applied to objects without an ability for dynamic provision of interfaces. An interface adapter 903 providing an offered interface 931, constituting an interface requested by user object 901, is arranged between user object 901 and service object 902, in a manner equivalent to that described above with respect to previous embodiments, for example see FIG. 2 and the description thereof.

A legacy object 904 is wrapped by service object 902. Legacy object 904, in one embodiment, is an object, which was created at an earlier point in time, without the functionality of dynamic interface adapter generation. Therefore, service object 902 wraps legacy object 904 thereby allowing user object 901 to employ the functionality of legacy object 904.

Legacy object 904 is an object, which is not arranged to generate an adapter request for an unavailable interface, i.e. for a request-interface requested by a user object, which is not available at the legacy object. The capability of generating an adapter request is provided by service object 902 being linked to legacy object 904, or wrapping legacy object 904. The link between service object 902 and legacy object 904 is provided through the use of software pointers or similar mechanisms.

A service object for wrapping or linking to legacy object 904 is generated by a wrapper object factory, which essentially is constituted by a library of a large number of service objects which may be selected by the wrapper object factory to be added to individual legacy objects. Further, the legacy object itself may also be selected by a legacy object factory, similar to the service object, from a library of legacy objects. A factory can be any means able to select objects from libraries for suiting specific needs, e.g. to provide functionality to a requesting entity.

Accordingly, this embodiment of the present invention not only allows dynamically generating interface adapters at runtime, i.e., during operations as for example executing an application program, but also allows dynamically providing service objects for adding required functionality to legacy objects, which are not able to generate interface adapter requests.

Figure 10:
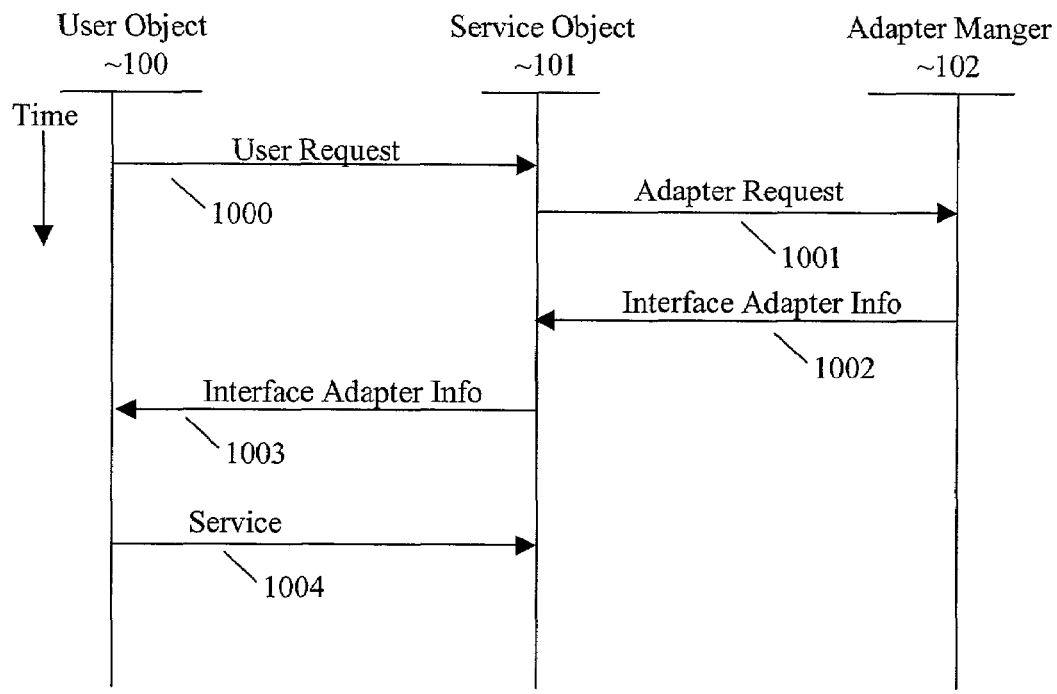
FIG. 10 illustrates a time sequence of messages between a user object, a service object and an adapter manager according to one embodiment of the invention.

FIG. 10 outlines a time sequence of transmissions between a user object, a service object and an adapter manager according to another embodiment of the invention. The sequence of transmissions of FIG. 10 is described as being carried out using system 150 of FIG. 1. However, the embodiment of FIG. 10 is not limited thereto.

In a first operation 1000, a user request is transmitted from user object 100 to service object 101, as for example described above with respect to previous embodiments. In an operation 1001, service object 101 generates and transmits an adapter request to adapter manager 102, also as described above with respect to previous embodiments.

After adapter manager 102 selects an appropriate interface adapter, in an operation 1002, adapter manager 102 transmits the selected interface adapter to service object 101, e.g. an address of the interface adapter, a pointer, or a code sequence making up the interface adapter.

In an operation 1003, service object 101 transmits the interface adapter, an interface adapter address or a pointer to user object 100, thus enabling user object 100 to access service object 101 in an operation 1004. Although operation 1004 is shown one-directional, a bi-directional transmission may be included.

Figure 11:
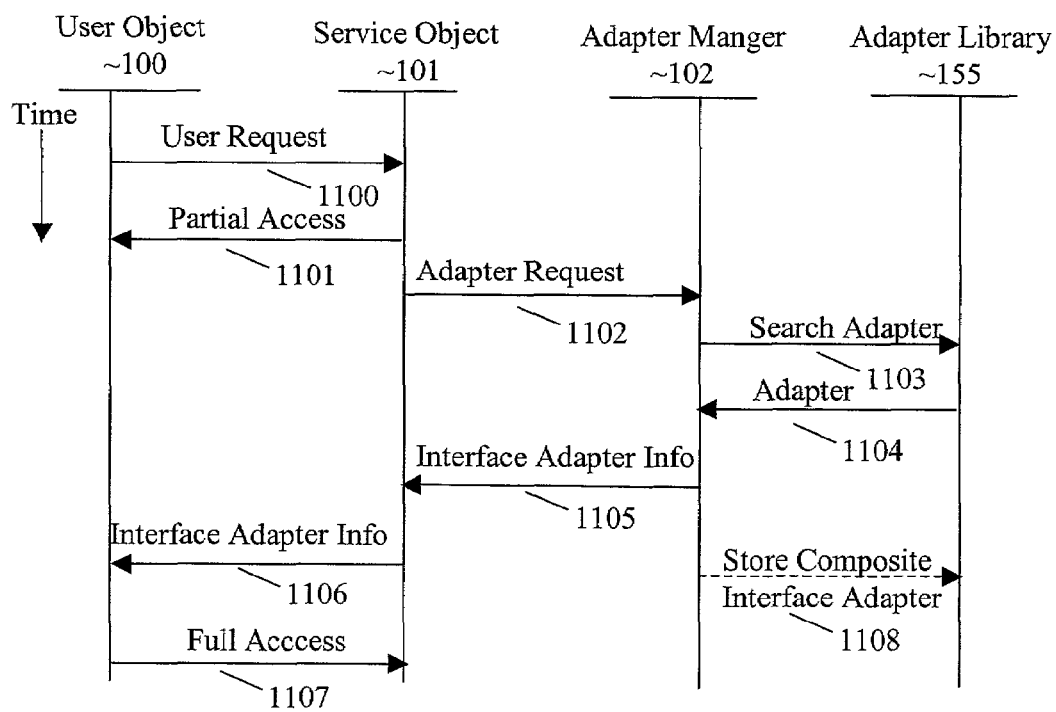
FIG. 11 illustrates a time sequence of operations at a user object, a service object, an adapter manager and an adapter library according to another embodiment of the invention.

FIG. 11 shows a time sequence of transmissions between a user object, a service object, an adapter manager and an adapter library according to another embodiment of the invention. While the operations are shown as carried out using system 150 of FIG. 1, the embodiment of FIG. 11 is not limited thereto.

In a first operation 1100, user object 100 transmits a user request to service object 101, for example as described above with respect to previous embodiments. In a second operation 1101, if an interface for enabling partial direct access to service object 101 by user object 100 is available, as for example outlined with respect to FIG. 8, a partial access is enabled for user object 100.

In an operation 1102, service object 101 generates an adapter request based on a remaining part of the remaining request-interfaces, requested by user object 100, as described above with respect to previous embodiments. In an operation 1103, adapter manager 102 searches for a suitable interface adapter in library 155. An interface adapter is returned from library 155 in an operation 1104. This may involve selecting and composing composite interface adapters, as described above with respect to previous embodiments.

In an operation 1105, adapter manager 102 transmits the selected interface adapter or generated composite interface adapter to service object 101, e.g. physically or via an address, as described before. In an operation 1106, service object 101 transmits the adapter address to user object 100, enabling full access to service object 101 by user object 100 in an operation 1107.

If a composite interface adapter was aggregated by adapter manager 102 in this process, in an optional operation 1108, outlined by a broken line, the composite interface adapter is stored in library 155. This makes the composite interface adapter available for further adapter requests. In addition, a classifier for the composite interface adapter may be stored in operation 1108 or in yet another operation.

While the operations shown in FIG. 11 are illustrated in a certain time sequence, variations of the time sequence of operations are possible. For example, the enablement of partial access of operation 1101 may be concurrent with operation 1107, to enable full access to service object 101 in a single operation.

Figure 12:
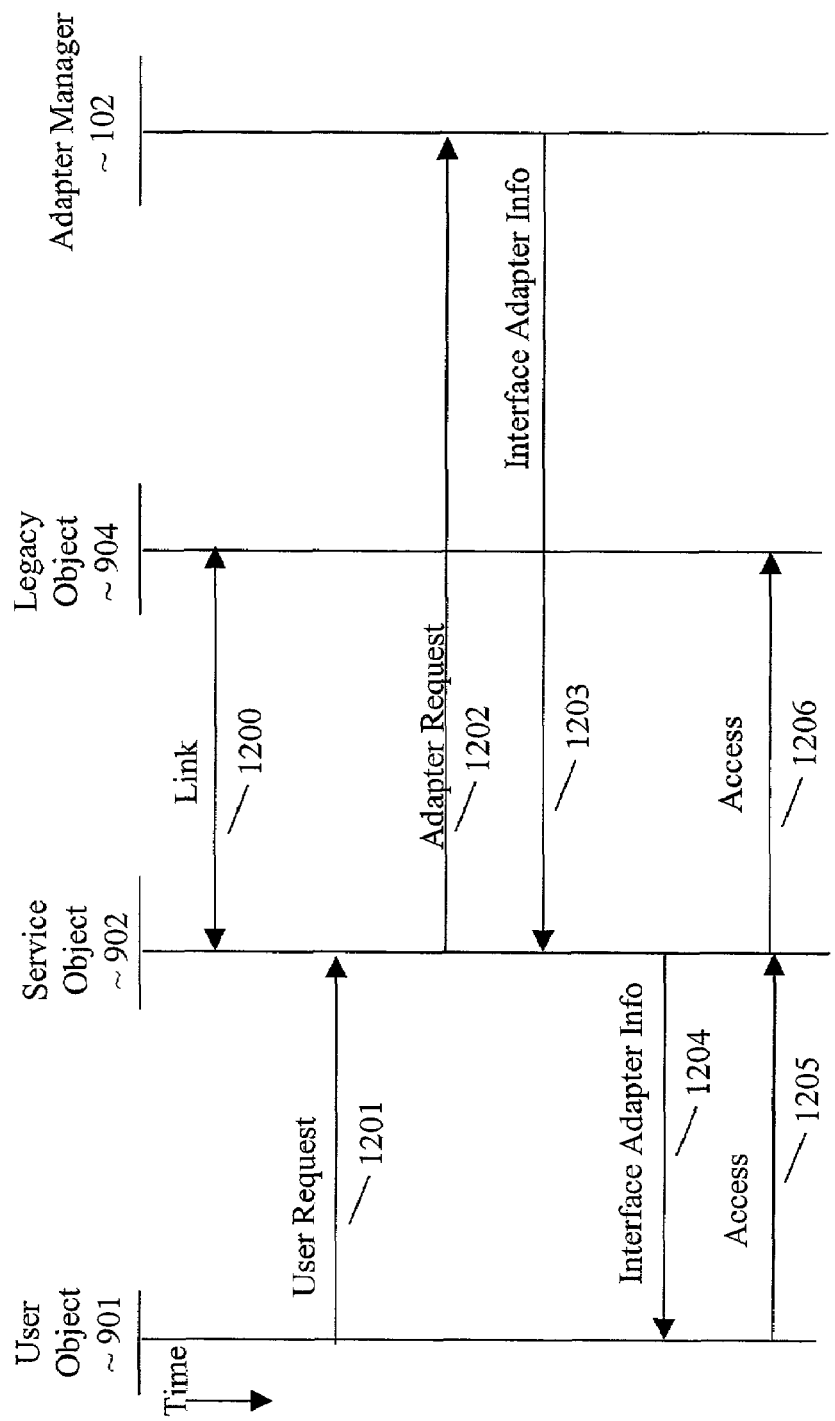
FIG. 12 illustrates a time sequence of operations executed at a user object, a service object, a legacy object and an adapter manager according to yet another embodiment of the invention.

In the following, a further embodiment of the invention is described with respect to FIG. 12. FIG. 12 shows a time sequence of operations at a user object, a service object, a legacy object and an adapter manager according to another embodiment of the invention. While in one embodiment the operations of FIG. 12 may be carried out using system 150 of FIG. 1 with the objects of FIG. 9, the embodiment of FIG. 12 is not limited thereto.

In a first operation 1200, a link is established between service object 902 and legacy object 904, as for example described with respect to FIG. 9. Legacy object 904 is unable to generate an adapter request. Consequently, legacy object 904 is linked to service object 902 to include legacy object 904, e.g. an old object into one embodiment of the system of the invention.

On behalf of legacy object 904, in an operation 1201, service object 902 receives a user request from user object 901. In an operation 1202, service object 902 transmits an adapter request to adapter manager 102 and receives an interface adapter, an interface adapter address, or a pointer in an operation 1203, as described with respect to previous embodiments.

In an operation 1204, the interface adapter, the interface adapter address, or pointer is transmitted to user object 901, enabling access from user object 901 to service object 1902 in an operation 1205. The user access is intended to obtain functionality of legacy object 904. Therefore, since legacy object 904 and service object 902 are linked, in an operation 1206, the functionality of legacy object 904 is accessed by user object 901 through service object 902. The embodiment of FIG. 12 illustrates how legacy objects, i.e. objects not adapted according to the invention, are wrapped by service objects, providing the capability of generating adapter requests and handling interface adapters.

It is noted that a computer-readable medium may be provided having a program recorded thereon, where the program is to make a computer or system of data processing devices execute functions or operations of the features and elements of the above described embodiments of FIGS. 1 to 12. A computer-readable medium can be not only a magnetic or optical or other tangible medium on which a program is recorded, but also can be a signal, e.g., analog or digital, electromagnetic or optical, in which the program is embodied for transmission. Further, a computer program product may be provided comprising the computer-readable medium.

As shown in the above description, the embodiments of this invention allow a dynamic generation of interfaces between user objects and service objects, by providing suitable interface adapters on demand, on runtime. The interface adapters for connecting from user objects to service objects can be generated beforehand and stored in a library of interface adapters and then selected or aggregated upon demand. Thus, costly rewriting of code for adding all possible interface configurations to existing code is not necessary, it is only required to write the required interface adapters and to make them available through the adapter manager. Accordingly, existing code does not have to be changed, when part of a number of objects of an application program or a plurality of application programs is updated. Further, even if old code, i.e. legacy objects do not have the functionality of generating adapter requests, service objects linking to the legacy objects can be provided, allowing the use of legacy objects in a system according to the embodiments of this invention.

We claim:

1. A computer-based method of dynamic interface generation comprising:
   receiving an adapter request including:
      at least information on an at least one offer-interface offered by a service object; and
      a request-interface demanded by a user object;
   obtaining an interface adapter from the request-interface to the at least one offer-interface offered by the service object; and
   transmitting at least information on the interface adapter for enabling the user object to access the service object.

2. The method of claim 1 wherein said obtaining an interface adapter further comprises:
   selecting the interface adapter from a library of interface adapters.

3. The method of claim 1 wherein said obtaining an interface adapter further comprises:
   selecting the interface adapter based on a list of interface adapter offered interfaces including at least one offered interface, and a list of interface adapter needed interfaces including at least one needed interface.

4. The method of claim 3 wherein said selecting the interface adapter further comprises:
selecting an interface adapter based on a classifier stored in connection with the interface adapters if more than one interface adapter is available.

5. The method of claim 1 wherein said obtaining an interface adapter further comprises:
generating a composite interface adapter based on a plurality of interface adapters, upon the interface adapter being unavailable in a library of interface adapters.

6. The method of claim 5 wherein the composite interface adapter includes a first interface adapter connecting the request-interface to an at least one intermediate interface and a second interface adapter connecting the at least one intermediate interface to the at least one offer-interface.

7. The method of claim 6 wherein the composite interface adapter includes a third interface adapter connecting a first part of the request-interface to the at least one offer-interface, and a fourth interface adapter connecting a second part of the request-interface to the at least one offer-interface.

8. The method of claim 5 further comprising:
adding the composite interface adapter to the library of interface adapters.

9. The method of claim 8 further comprising:
storing a classifier in association with the composite interface adapter, the classifier indicating that the interface adapter is a composite interface adapter.

10. The method of claim 1 wherein said information on an at least one offer-interface offered by a service object comprises:
information on an access interface at the service object.

11. The method of claim 10 further comprising:
accessing the service object via said access interface to determine offer-interfaces available at the service object.

12. The method of claim 1 wherein said information on an at least one offer-interface offered by a service object comprises information on data available at the service object, and said obtaining an interface adapter further comprises:
selecting an indirect interface adapter, the indirect adapter allowing the user object to access the data at the service object through the at least one interface offered by the service object.

13. The method of claim 1 further comprising:
determining whether a part of the request-interface is available at the service object and serving the user object based on the part of the available request-interface; and
generating the adapter request based on a remaining part of the request-interface.

14. The method of claim 1 further comprising:
linking the service object to a legacy object wherein the legacy object comprises an object not arranged to generate the adapter request.

15. The method of claim 14 further comprising:
using a wrapper object factory to obtain the service object; and
using a legacy object factory to obtain the legacy object.

16. A computer-based method of dynamic interface generation for a service object comprising:
receiving at the service object a user request for a request-interface from a user object; and
generating an adapter request for transmission to an adapter manager, the adapter request including at least information on an at least one offer-interface, offered by the service object, and the request-interface.

17. The method of claim 16 further comprising:
transmitting the adapter request to the adapter manager to instruct the adapter manager to obtain an interface adapter from the request-interface to at least one of the offer-interfaces at the service object.

18. The method of claim 17 further comprising:
receiving, at the service object, at least information on the interface adapter and enabling an access to the service object from the user object based on the interface adapter.

19. The method of claim 18 further comprising:
transmitting an address of the interface adapter by the service object to the user object for enabling the user object to access the service object.

20. The method of claim 16 wherein said generating said adapter request further comprises:
determining whether a part of the request-interface is available at the service object and serving the user object based on the part of the available request-interface; and
generating the adapter request based on a remaining part of the request-interface.

21. The method of claim 16 further comprising:
linking the service object to a legacy object wherein the legacy object comprises an object not arranged to generate the adapter request.

22. The method of claim 21 further comprising:
using a wrapper object factory to obtain the service object; and
using a legacy object factory to obtain the legacy object.

23. The method of claim 17 further comprising:
selecting the interface adapter from a library of interface adapters available to the adapter manager.

24. The method of claim 17 further comprising:
selecting the interface adapter based on a list of interface adapter offered interfaces including at least one offered interface, and a list of interface adapter needed interfaces including at least one needed interface.

25. The method of claim 24 wherein said selecting the interface adapter further comprises:
selecting an interface adapter based on a classifier stored in connection with the interface adapters if more than one interface adapter is available.

26. The method of claim 17 further comprising:
generating a composite interface adapter based on a plurality of interface adapters, upon the interface adapter being unavailable in a library of interface adapters.

27. The method of claim 26 wherein the composite interface adapter includes a first interface adapter connecting the request-interface to at least one intermediate interface and a second interface adapter connecting the at least one intermediate interface to the at least one offer-interface.

28. The method of claim 27 wherein the composite interface adapter includes a third interface adapter connecting a first part of the request-interface to the at least one offer-interface, and a fourth interface adapter connecting a second part of the request-interface to the at least one offer-interface.

29. The method of claim 26 further comprising:
adding the composite interface adapter to the library of interface adapters.

30. The method of claim 29 further comprising:
   storing a classifier in association with the composite interface adapter, the classifier indicating that the interface adapter is a composite interface adapter.

31. The method of claim 17 wherein said information on an at least one offer-interface offered by the service object comprises:
   information on an access interface at the service object.

32. The method of claim 31 further comprising:
   accessing the service object via said access interface to determine offer-interfaces available at the service object.

33. The method of claim 17 wherein said information on an at least one offer-interface offered by a service object comprises information on data available at the service object, and said method further comprises:
   selecting an indirect interface adapter, the indirect adapter allowing the user object to access the data at the service object through the at least one interface offered by the service object.

34. A tangible computer readable medium, in which a program is embodied, where the program is to make a computer execute a method of dynamic interface generation comprising:
   receiving an adapter request including:
      at least information on an at least one offer-interface offered by a service object; and
      a request-interface demanded by a user object;
   obtaining an interface adapter from the request-interface to the at least one offer-interface offered by the service object; and
   transmitting at least information on the interface adapter for enabling the user object to access the service object.

35. A computer program product comprising:
   a tangible computer readable medium, in which a program is embodied, where the program is to make a computer execute a method of dynamic interface generation comprising:
      receiving an adapter request including:
         at least information on an at least one offer-interface offered by a service object; and
         a request-interface demanded by a user object;
      obtaining an interface adapter from the request-interface to the at least one offer-interface offered by the service object; and
      transmitting at least information on the interface adapter for enabling the user object to access the service object.

36. A tangible computer readable medium, in which a program is embodied, where the program is to make a computer execute a method of dynamic interface generation for a service object comprising
   receiving at the service object a user request for a request-interface from a user object; and
   generating an adapter request for transmission to an adapter manager, the adapter request including at least information on an at least one offer-interface, offered by the service object, and the request-interface.

37. The tangible computer readable medium of claim 36 wherein the method further comprises:
   transmitting the adapter request to the adapter manager to instruct the adapter manager to obtain an interface adapter from the request-interface to at least one of the offer-interfaces at the service object.

38. The tangible computer readable medium of claim 37 wherein the method further comprises:
   receiving, at the service object, at least information on the interface adapter and enabling an access to the service object from the user object based on the interface adapter.

39. A computer program product comprising:
   a tangible computer readable medium, in which a program is embodied, where the program is to make a computer execute a method of dynamic interface generation for a service object comprising
      receiving at the service object a user request for a request-interface from a user object; and
      generating an adapter request for transmission to an adapter manager, the adapter request including at least information on an at least one offer-interface, offered by the service object, and the request-interface.

40. An adapter manager structure comprising:
   an adapter manager receiving module wherein said adapter manager receiving module receives from a service object an adapter request at least including information on an at least one offer-interface offered by the service object, and a request-interface demanded by a user object;
   an adapter manager determining module coupled to said adapter manager receiving module wherein said adapter manager determining module obtains an interface adapter from the request-interface to the at least one offer-interface offered by the service object; and
   an adapter manager transmission module coupled to said adapter manager determining module wherein said adapter manager transmission module transmits at least information on the interface adapter to the service object for enabling the user object to access the service object.

41. The adapter manager of claim 40 wherein the adapter manager determining module is arranged to obtain the interface adapter from a library of interface adapters available to the adapter manager.

42. The adapter manager of claim 40 wherein the adapter manager determining module further comprises means for obtaining the interface adapter from a library of interface adapters available to the adapter manager.

43. The adapter manager of claim 40 wherein the adapter manager determining module is arranged to obtain an interface adapter based on a list of interface adapter offered interfaces including at least one offered interface, and a list of interface adapter needed interfaces including at least one needed interface.

44. The adapter manager of claim 40 wherein the adapter manager determining module further comprises means for obtaining an interface adapter based on a list of interface adapter offered interfaces including at least one offered interface, and a list of interface adapter needed interfaces including at least one needed interface.

45. The adapter manager of claim 40 wherein the adapter manager determining module is arranged, if more than one interface adapter is available, to select an interface adapter based on a classifier stored in connection with the interface adapters.

46. The adapter manager of claim 40 wherein the adapter manager determining module, if an interface adapter is not available, is arranged to generate a composite interface adapter based on a plurality of interface adapters.

47. The adapter manager of claim 46 wherein the composite interface adapter includes a first interface adapter connecting the request-interface to at least one intermediate interface and a second interface adapter connecting the at least one intermediate interface to the at least one offer-interface.

48. The adapter manager of claim 47 wherein the composite interface adapter includes a third interface adapter connecting a first part of the request-interface to the at least one offer-interface, and a fourth interface adapter connecting a second part of the request-interface to the at least one offer-interface.

49. The adapter manager of 46 wherein the adapter manager determining module is arranged to add the composite interface adapter to a library of interface adapters.

50. The adapter manager of claim 49 wherein the determining module is arranged to store a classifier in association with the composite interface adapter, the classifier indicating that the composite interface adapter is a composite interface adapter.

51. The adapter manager of claim 40 wherein the adapter request includes information on an access interface at the service object, allowing the adapter manager to access the service object to determine offer-interfaces available at the service object.

52. The adapter manager of claim 40 wherein the adapter request includes information on data available at the service object; and the adapter manager determining module is arranged to select an indirect interface adapter, the indirect interface adapter allowing the user object to access the data at the service object through at least one interface available at the service object.

53. A service object structure comprising:
a service object receiving module wherein said service object receiving module receives from a user object a user request for a request-interface;
a service object request generating module coupled to said service object receiving module wherein said service object request generating module generates an adapter request for transmission to an adapter manager, the adapter request at least including information on an at least one offer-interface offered by the service object, and the request-interface; and
a service object transmission module for transmitting the adapter request to the adapter manager to instruct the adapter manager to obtain an interface adapter from the request-interface to said at least one of the offer-interface at the service object.

54. The service object of claim 53 wherein said service object receiving module is arranged to receive at least information on the interface adapter for enabling an access from the user object based on the interface adapter.

55. The service object of claim 53 wherein the adapter request includes information on an access interface at the service object, allowing the adapter manager to access the service object to determine offer-interfaces available at the service object.

56. The service object of claim 53 wherein the service object transmission module is arranged to transmit an address of the interface adapter to the user object for enabling the user object to access the service object.

57. The service object of claim 53 further comprising:
a service object determining module coupled to said service object receiving module and to said service object request generating module,
wherein said service object determining module determines whether a part of the request-interface is available at the service object and serves the user object based on the part of the available request-interface; and
further wherein the service object request generating module is arranged to generate the adapter request based on a remaining part of the request-interface.

58. The service object of claim 53 wherein the service object includes a link to a legacy object, the legacy object being an object not arranged to generate an adapter request for an unavailable interface.

* * * * *